(12) United States Patent
Shimizu et al.

(10) Patent No.: US 10,884,121 B2
(45) Date of Patent: Jan. 5, 2021

(54) INTER-VEHICLE DISTANCE CONTROL DEVICE

(71) Applicant: Mitsubishi Electric Corporation, Tokyo (JP)

(72) Inventors: Yuji Shimizu, Tokyo (JP); Kazuhiro Nishiwaki, Tokyo (JP); Masahiro Iezawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/396,085

(22) Filed: Apr. 26, 2019

(65) Prior Publication Data

US 2019/0391259 A1 Dec. 26, 2019

(30) Foreign Application Priority Data

Jun. 21, 2018 (JP) .................. 2018-117578

(51) Int. Cl.
  *G01S 13/931* (2020.01)
  *B60K 31/00* (2006.01)
  *B60W 30/16* (2020.01)

(52) U.S. Cl.
  CPC ........ *G01S 13/931* (2013.01); *B60K 31/0008* (2013.01); *B60W 30/16* (2013.01); *B60K 2031/0025* (2013.01); *B60K 2031/0033* (2013.01); *B60W 2554/801* (2020.02); *B60W 2754/30* (2020.02); *G01S 2013/932* (2020.01); *G01S 2013/9325* (2013.01)

(58) Field of Classification Search
  USPC ................................... 340/903, 435; 701/96
  See application file for complete search history.

(56) References Cited

U.S. PATENT DOCUMENTS

| 6,330,507 B1* | 12/2001 | Adachi .............. B60K 31/0008 180/169 |
| 2002/0055813 A1 | 5/2002 | Adachi et al. |
| 2004/0061626 A1* | 4/2004 | Kubota .............. B60K 31/0008 701/96 |

FOREIGN PATENT DOCUMENTS

JP 3661495 B2 6/2005

* cited by examiner

*Primary Examiner* — Brent Swarthout
(74) *Attorney, Agent, or Firm* — Sughrue Mion, PLLC; Richard C. Turner

(57) ABSTRACT

An inter-vehicle distance control device that achieves inter-vehicle distance control satisfying the driver includes a preceding vehicle velocity computation part that computes a preceding vehicle velocity on the basis of a host vehicle velocity and a relative velocity of the preceding vehicle, a target inter-vehicle setting art that sets a target inter-vehicle distance from the preceding vehicle on the basis of the preceding vehicle velocity, a target track generator that generates a target track and a target track differential, the target track defining a time history lasting until the initial value of the inter-vehicle distance reaches the target inter-vehicle distance, and a feedback controller that computes a feedback acceleration command by multiplying a deviation of the inter-vehicle distance from the target track and a deviation of the relative velocity from the target track differential value by a gain. The feedback acceleration command is output as an acceleration command.

14 Claims, 25 Drawing Sheets

F I G. 13

| No | CONDITION | FINAL ACCELERATION DESIGN VALUE $a_{plan}[m/s^2]$ |
|---|---|---|
| 1 | $V_{err} < 0$ | $a_{set0}$ |
| 2 | $(V_{err} \geqq 0)$ and $(a_{set1} \leqq a_{brk1})$ | $a_{set1}$ |
| 3 | $(V_{err} \geqq 0)$ and $(a_{set2} \leqq a_{brk1} < a_{set1})$ | $a_{brk1}$ |
| 4 | $(V_{err} \geqq 0)$ and $(a_{brk2} \leqq a_{set2} < a_{brk1})$ | $a_{set2}$ |
| 5 | $(V_{err} \geqq 0)$ and $(a_{set3} \leqq a_{brk2} < a_{set2})$ | $a_{brk2}$ |
| 6 | $(V_{err} \geqq 0)$ and $(a_{brk3} < a_{set3})$ | $a_{set3}$ |

FIG. 14

| No | Final acceleration design value $a_{plan}$ [m/s²] | Achievement of acceleration design value $a_{plan} \geq a_{set*}$ ||||Achievement of closest approach distance design value $D_{min} \geq D_{set*}$ ||
|---|---|---|---|---|---|---|---|
| | | $\geq a_{set0}$ | $\geq a_{set1}$ | $\geq a_{set2}$ | $\geq a_{set3}$ | $\geq D_{set1}$ | $\geq D_{set2}$ |
| 1 | $a_{set0}$ | ○ | ○ | ○ | ○ | ○ | ○ |
| 2 | $a_{set1}$ | × | ○ | ○ | ○ | ○ | ○ |
| 3 | $a_{brk1}$ | × | × | ○ | ○ | ○ | ○ |
| 4 | $a_{set2}$ | × | × | ○ | ○ | × | ○ |
| 5 | $a_{brk2}$ | × | × | × | ○ | × | ○ |
| 6 | $a_{set3}$ | × | × | × | ○ | × | × |

FIG. 15

| ITEM | VARIABLE | VALUE | UNIT | REMARKS |
|---|---|---|---|---|
| ACCELERATION DESIGN VALUE | $a_{set0}$ | +0.5 | m/s² | FOR ACCELERATION |
| | $a_{set1}$ | −0.2 | m/s² | FOR DECELERATION (SMALL) |
| | $a_{set2}$ | −0.5 | m/s² | FOR DECELERATION (MEDIUM) |
| | $a_{set3}$ | −4.0 | m/s² | FOR DECELERATION (LARGE) |
| CLOSEST APPROACH DISTANCE DESIGN VALUE | $D_{set1}$ | $\max(D^*, D_{set2})$ | m | TARGET INTER-VEHICLE DISTANCE $D^*$ IS SET |
| | $D_{set2}$ | 20 | m | |
| INFINITESIMAL DISTANCE DESIGN VALUE | $\Delta D$ | 5 | m | |

INTER-VEHICLE DISTANCE CONTROL DEVICE

BACKGROUND OF THE INVENTION

Field of the Invention

The present invention relates to an inter-vehicle distance control device for controlling an inter-vehicle distance between its own vehicle thereinafter, referred to as a "host vehicle") and a preceding vehicle.

DESCRIPTION OF THE BACKGROUND ART

Inter-vehicle distance control devices are required to have response characteristics of inter-vehicle distance control adaptable to the drivers' feeling in various driving situations. For example, Japanese Patent No. 3,661,495 (hereinafter, referred to as a "prior art example") proposes an inter-vehicle distance control device having a two-stage configuration including an inter-vehicle distance controller and a vehicle velocity controller. The inter-vehicle distance controller defines a time history of the inter-vehicle distance lasting until the inter-vehicle distance converges to a target inter-vehicle distance via a filter, and generates a vehicle velocity command under feedback and feedforward control. Then, the vehicle velocity controller controls the host vehicle velocity in accordance with the vehicle velocity command. Such an inter-vehicle distance control device can simulate the driver's operating behavior by setting the response characteristics of an inter-vehicle distance control system, i.e., the frequency and attenuation coefficient of the filter, according to a target inter-vehicle deviation (i.e., a deviation of the detected value of the inter-vehicle distance from the target inter-vehicle distance) and the detected value of relative velocity.

The prior art example assumes a case where the preceding vehicle runs at a constant velocity, such as a scene where the host vehicle detects and approaches a distant, slow-moving preceding vehicle while decelerating, or a scene where a preceding vehicle cuts-in just in front of the host vehicle. In such driving situations, much importance is given to the response characteristics exhibited until when the inter-vehicle distance converges to the target inter-vehicle distance and the host vehicle velocity converges to the preceding vehicle velocity, and the prior art example uses the filter to design the response characteristics.

The inter-vehicle distance control device also needs to be adaptable to scenes where the preceding vehicle velocity varies, such as a scene where the host vehicle follows the preceding vehicle that decelerates and stops. In the above-described scene of following the preceding vehicle, the target inter-vehicle distance also decreases with the deceleration of the preceding vehicle. Thus, the inter-vehicle distance control device needs to combine "acceleration for reducing the inter-vehicle distance" and "deceleration according to the deceleration of the preceding vehicle" in response to the reduced target inter-vehicle distance so as to follow the preceding vehicle.

In the prior art example, the vehicle velocity command is generated from a sum of the feedback control, the feedforward control, and the preceding vehicle velocity. The feedforward control in the second term corresponds to the "acceleration for reducing the inter-vehicle distance" and the preceding vehicle velocity in the third term corresponds to the "deceleration according to the deceleration of the preceding vehicle." However, in the case of the inter-vehicle distance control device having the two-stage configuration including the inter-vehicle distance controller and the vehicle velocity controller, a steady-state deviation of the inter-vehicle distance occurs in the "deceleration according to the deceleration of the preceding vehicle velocity" due to a response delay of the vehicle velocity controller. That is, the inter-vehicle distance is reduced and the host vehicle gets closer to the preceding vehicle by an amount corresponding to the response delay of the vehicle velocity controller. Thus, the prior art example holds the possibility of the host vehicle being unable to keep the inter-vehicle distance when making a stop in a scene where the host vehicle follows the preceding vehicle that decelerates and stops. Accordingly, the inter-vehicle distance control adaptable to the driver's feeling in various driving situations cannot be achieved with conventional inter-vehicle distance control devices.

SUMMARY

The present invention provides an inter-vehicle distance control device that achieves inter-vehicle distance control satisfying the driver.

The inter-vehicle distance control device according to the present invention is an inter-vehicle distance control device for controlling an inter-vehicle distance from a preceding vehicle by computing an acceleration command on the basis of the inter-vehicle distance from the preceding vehicle, a relative velocity of the preceding vehicle, and a velocity of a host vehicle and inputting the acceleration command to a vehicle driver that controls vehicle drive. The inter-vehicle distance control device includes a preceding vehicle velocity computation part to compute a velocity of the preceding vehicle on the basis of the velocity of the host vehicle and the relative velocity of the preceding vehicle, a target inter-vehicle setting part to set a target inter-vehicle distance from the preceding vehicle on the basis of the velocity of the preceding vehicle, a target track generator to generate a target track and a target track differential value that is a differential value of the target track, the target track defining a time history of the inter-vehicle distance lasting until an initial value of the inter-vehicle distance reaches the target inter-vehicle distance, and a feedback controller to compute a feedback acceleration command by multiplying each of a deviation of the inter-vehicle distance from the target track and a deviation of the relative velocity from the target track differential value by a gain. The feedback acceleration command is output as the acceleration command.

The above-described inter-vehicle distance control device can generate a target track that defines the time history of the inter-vehicle distance lasting until the initial value of the inter-vehicle distance reaches the target inter-vehicle distance, and can perform feedback control so as to make the target track match the actual inter-vehicle distance. This enables achieving the inter-vehicle distance control device that can satisfy the driver not only in a scene where the host vehicle detects and approaches a distant, slow-moving preceding vehicle while decelerating, but also in a scene where the host vehicle follows a preceding vehicle that decelerates and stops.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 illustrates a final acceleration design value in the target track design part according to the third preferred embodiment of the present invention;

FIG. 14 illustrates each final acceleration design value and magnitude relationships of an acceleration design value and a closest approach distance design value in the target track design part according to the third preferred embodiment of the present invention;

FIG. 15 illustrates design parameters in the target track design part according to the third preferred embodiment of the present invention;

DESCRIPTION OF THE PREFERRED EMBODIMENTS

First Preferred Embodiment

<Device Configuration>

Figure 1:
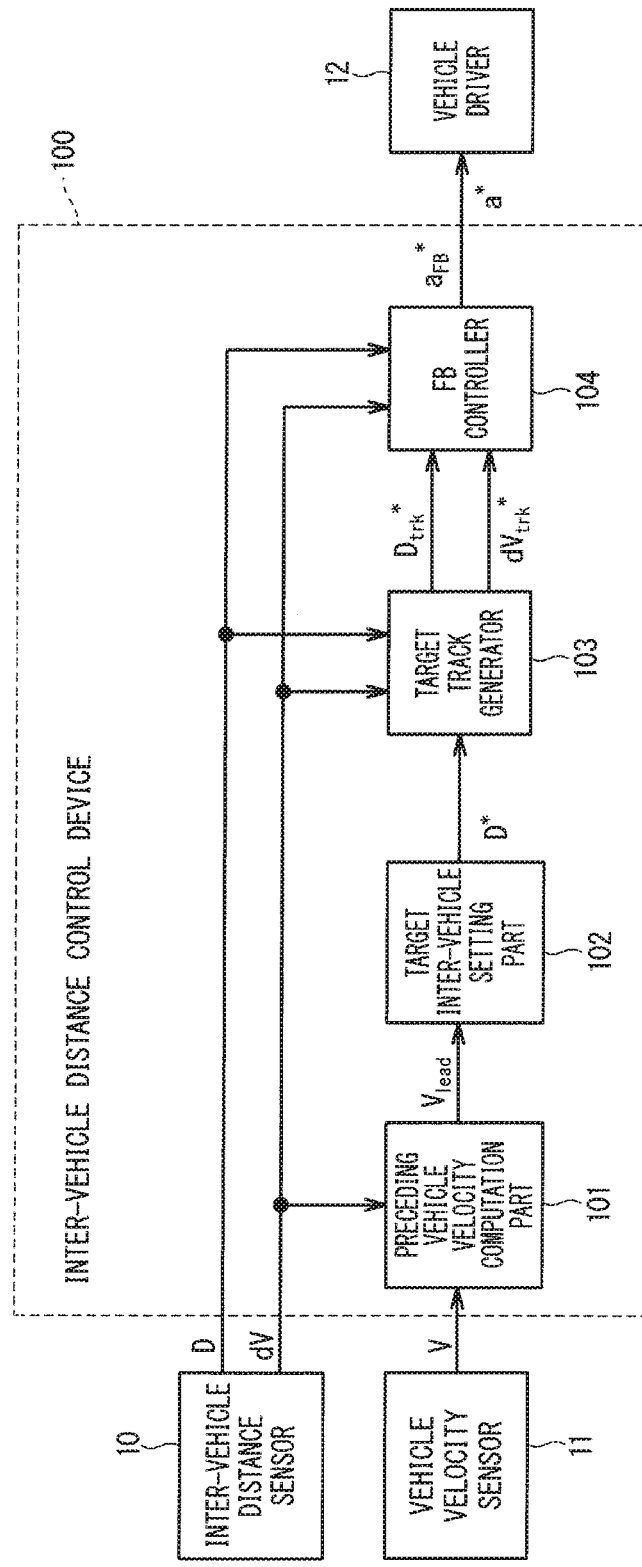
FIG. 1 is a functional block diagram illustrating a configuration of an inter-vehicle distance control device according to a first preferred embodiment of the present invention.

FIG. 1 is a functional block diagram illustrating a configuration of an inter-vehicle distance control device 100 according to a first preferred embodiment of the present invention. As illustrated in FIG. 1, the inter-vehicle distance control device 100 generates an acceleration command a* on the basis of an inter-vehicle distance D from a preceding vehicle, a relative velocity dV of the preceding vehicle using a host vehicle as a reference, and a host vehicle velocity V and inputs the acceleration command a* to a vehicle driver 12. The acceleration command a* is a command for causing the host vehicle to run while keeping the inter-vehicle distance from the preceding vehicle. The inter-vehicle distance D and the relative velocity dV are detected by an inter-vehicle distance sensor 10, and the host vehicle velocity V is detected by a vehicle velocity sensor 11. In accordance with the acceleration command a*, the vehicle driver 12 controls an engine or drive motor, or a brake and provides braking or driving force so that the acceleration a of the vehicle conforms to the acceleration command a*.

As illustrated in FIG. 1, the inter-vehicle distance control device 100 includes a preceding vehicle velocity computation part 101, a target inter-vehicle setting part 102, a target track generator 103, and a feedback (113) controller 104. The inter-vehicle distance D from the preceding vehicle, detected by the inter-vehicle distance sensor 10, is input to the target track generator 103 and the FB controller 104, and the relative velocity dV of the preceding vehicle is input to the preceding vehicle velocity computation part 101, the target track generator 103, and the FB controller 104. The host vehicle velocity V detected by the vehicle velocity sensor 11 is input to the preceding vehicle velocity computation part 101.

The preceding vehicle velocity computation part 101 computes a preceding vehicle velocity $V_{lead}$ on the basis of the relative velocity dV of the preceding vehicle detected by the inter-vehicle distance sensor 10 and the host vehicle velocity V detected by the vehicle velocity sensor 11, and inputs the preceding vehicle velocity $V_{lead}$ to the target inter-vehicle setting part 102.

The target inter-vehicle setting part 102 generates a target inter-vehicle distance D* that is a target value of inter-vehicle distance control on the basis of the preceding vehicle velocity $V_{lead}$, and inputs the target inter-vehicle distance D* to the target track generator 103.

The target track generator 103 generates a target track $D_{trk}*$ and a target track differential value $dV_{trk}*$ on the basis of the target inter-vehicle distance D*, the inter-vehicle distance D, and the relative velocity dV and inputs the target track $D_{trk}*$ and the target track differential value $dV_{trk}*$ to the FB controller 104. The target track $D_{trk}*$ is a track that defines a time history lasting until the inter-vehicle distance D converges to the target inter-vehicle distance D*, and the target track differential value $dV_{trk}*$ is a differential value of the target track $D_{trk}*$.

The FB controller 104 generates the acceleration command a* on the basis of the inter-vehicle distance D, the relative velocity dV, the target track $D_{trk}*$, and the target track differential value $dV_{trk}*$ and inputs the acceleration command a* to the vehicle driver 12.

Next, an operation of each component of the inter-vehicle distance control device 100 will be described in detail. The preceding vehicle velocity computation part 101 uses the relative velocity dV and the host vehicle velocity V to obtain the preceding vehicle velocity $V_{lead}$ from Expression (1) below.

$$V_{lead} = V + dV \tag{1}$$

Then, the target inter-vehicle setting part 102 uses the preceding vehicle velocity $V_{lead}$ to obtain the target inter-vehicle distance D* from Expression (2) below.

$$D* = \tau_{THW} \times V_{lead} + D_{stop} \tag{2}$$

In Expression (2) above, $\tau_{THW}$ is a coefficient, and $D_{stop}$ is an offset, i.e., a target inter-vehicle distance when the preceding vehicle is stopped. Preparing a plurality of combinations of values in advance for the coefficient $\tau_{THW}$ and the offset $D_{stop}$ enables the driver to select the target inter-vehicle distance from a plurality of inter-vehicle settings, e.g., a plurality of stages such as Long (long distance), Middle (middle distance), and Short (short distance).

The target track generator 103 uses a filter to generate the target track $D_{trk}*$. The target track $D_{trk}*$ and the target track differential value $dV_{trk}*$ can be obtained from Expressions (3) and (4) below using the target inter-vehicle distance D* and the filter $F_{dref}(s)$, where s is a Laplace operator.

$$D_{trk}* = F_{dref}(s) D* \tag{3}$$

$$dV_{trk}* = s D_{trk}* = s(F_{dref}(s) D*) \tag{4}$$

In Expression (3) above, the time history lasting until the inter-vehicle distance D converges to the target inter-vehicle distance D* can be generated by setting the input of the filter $F_{dref}(s)$ as a step input from the inter-vehicle distance D at the start of control to the target inter-vehicle distance D*.

The filter $F_{dref}(s)$ is, for example, a two-stage moving-average filter that combines two moving-average filters. The transfer function of a moving-average filter having a time constant $\tau$ is given by Expression (5). Expression (5) represents the transfer function including a dead time element as indicated by $\exp(-\tau s)$.

$$F_{ave}(s) = \frac{1}{\tau} \frac{(1 - \exp(-\tau s))}{s} \tag{5}$$

The dead time element is replaced by a linear equation through Pade approximation to enable consideration of the influence of the dead time element. A second-order Pade approximation of the dead time element is given by Expression (6) below.

$$\exp(-\tau s) \approx \frac{1 - \frac{\tau s}{2} + \frac{(\tau s)^2}{12}}{1 + \frac{\tau s}{2} + \frac{(\tau s)^2}{12}} \tag{6}$$

From Expressions (5) and (6) above, a moving-average filter obtained through Pade approximation is given by Expression (7) below.

$$F_{ave}(s) = \frac{\frac{12}{\tau^2}}{s^2 + \frac{6}{\tau}s + \frac{12}{\tau^2}} \tag{7}$$

From Expression (7) above, the two-stage moving-average filter used in the target track generator 103 is given by Expression (8) below. Expression (8) gives a transfer function that combines two moving-average filters having time constants $\tau_{1d}$ and $\tau_{2d}$, respectively. The time constants $\tau_{1d}$ and $\tau_{2d}$ are preset so that the inter-vehicle distance control device 100 can have desired response characteristics.

$$F_{dref}(s) = \left[\frac{\frac{12}{\tau_{1d}^2}}{s^2 + \frac{6}{\tau_{1d}}s + \frac{12}{\tau_{1d}^2}}\right]\left[\frac{\frac{12}{\tau_{1d}^2}}{s^2 + \frac{6}{\tau_{2d}}s + \frac{12}{\tau_{2d}^2}}\right] \tag{8}$$

The FB controller 104 computes a feedback acceleration command $a_{FB}*$ from Expression (9) below on the basis of the inter-vehicle distance D, the relative velocity dV, the target track $D_{trk}*$, and the target track differential value $dV_{trk}*$. In Expression (9) below, $K_{dp}$ and $K_{dd}$ are feedback gains, and more specifically, they are respectively the gain of proportional control and the gain of derivative control.

$$a_{FB}* = K_{dp}(D_{trk}* - D) - K_{dd}(dV_{trk}* - dV) \tag{9}$$

The inter-vehicle distance control device 100 uses the feedback acceleration command $a_{FB}*$ as the acceleration command a* as indicated by Expression (10) below.

$$a* = a_{FB}* \tag{10}$$

In this way, feedback control including proportional control and derivative control is performed in the computation for generating the feedback acceleration command $a_{FB}*$. Thus, the target track $D_{trk}*$ and the inter-vehicle distance D can be matched even under external disturbances such as running resistance and gradients.

Figure 2:
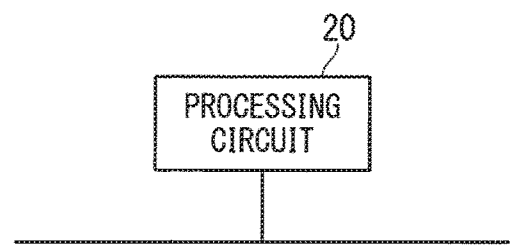
FIG. 2 is a block diagram illustrating a hardware configuration of the inter-vehicle distance control device according to the first preferred embodiment of the present invention.

The components of the inter-vehicle distance control device 100 described above can be configured using a computer, and each of these components is implemented by the computer executing programs. That is, the preceding vehicle velocity computation part 101, the target inter-vehicle setting part 102, the target track generator 103, and the FB controller 104 of the inter-vehicle distance control device 100 illustrated in FIG. 1 are implemented by, for example, a processing circuit 20 illustrated in FIG. 2. As the processing circuit 20, a processor is used such as a central processing unit (CPU) or a digital signal processor (DSP)

and like, and the functions of the above-described components can be implemented by the processor executing programs stored in a storage.

Note that dedicated hardware may be used as the processing circuit 20. If the processing circuit 20 is dedicated hardware, the processing circuit 20 corresponds to, for example, a single circuit, a complex circuit, a programmed processor, a parallel-programmed processor, an application specific integrated circuit (ASCI), a field programmable gate array (FPGA), or a combination of them.

Figure 3:
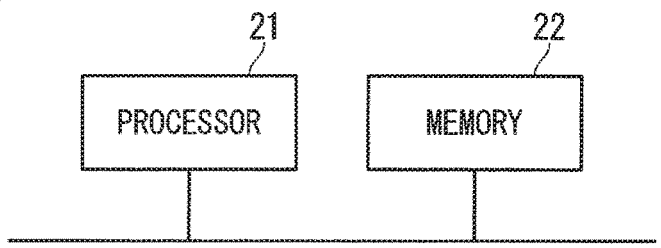
FIG. 3 is a block diagram illustrating the hardware configuration of the inter-vehicle distance control device according to the first preferred embodiment of the present invention.

FIG. 3 illustrates a hardware configuration when the components (the preceding vehicle velocity computation part 101, the target inter-vehicle setting part 102, the target track generator 103, and the FB controller 104) of the inter-vehicle distance control device 100 illustrated in FIG. 1 are configured using a processor. In this case, the function of each component of the inter-vehicle distance control device 100 is implemented by a combination of software and the like (software, firmware, or both software and firmware). The software and the like are described as programs and stored in a memory 22. The processor 21 functioning as the processing circuit 20 implements the function of each component by reading out and executing programs stored in the memory 22 (storage).

<Operations>

Figure 4:
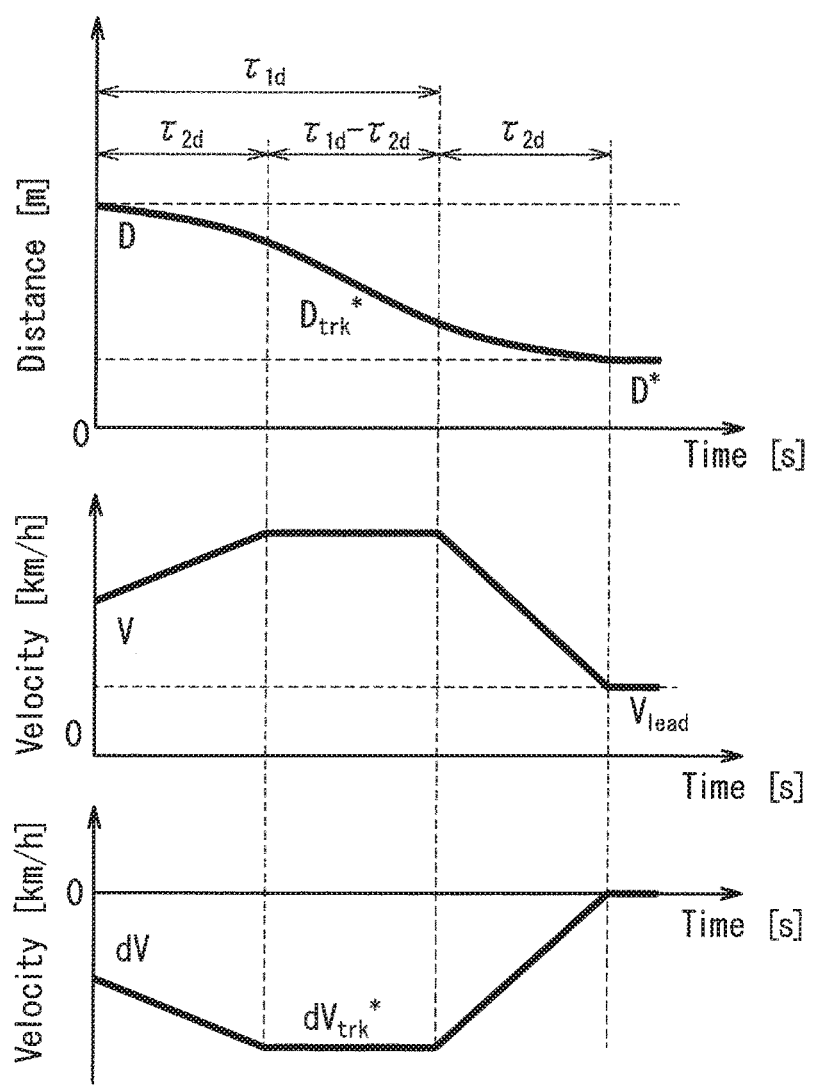
FIG. 4 illustrates an operation of a target track generator according to the first preferred embodiment of the present invention.

Hereinafter, operations of the inter-vehicle distance control device 100 will be described. FIG. 4 illustrates an operation of the target track generator 103 and provides three characteristic charts. The chart in the upper section of FIG. 4 illustrates a temporal change in inter-vehicle distance (Distance [m]), the chart in the middle section illustrates a temporal change in velocity (Velocity [km/h]), and the chart in the lower section illustrates a temporal change in relative velocity (Velocity [km/h]). In all of these charts, the horizontal axis indicates time (Time [s]).

The change in inter-vehicle distance in the upper chart represents a change in the target track $D_{trk}^*$ generated by the filters $F_{dref}(s)$ with the time constants $\tau_{1d}$ and $\tau_{2d}$, and the inter-vehicle distance D converges to the target inter-vehicle distance $D^*$. The change in velocity in the middle chart represents a time history of the host vehicle velocity V in which an acceleration operation is performed during a time period $\tau_{2d}$, an constant speed operation is performed during a time period ($\tau_{1d}-\tau_{2d}$), and a deceleration operation is performed during another time period $\tau_{2d}$, and the host vehicle velocity V converges to the preceding vehicle velocity $V_{lead}$ over a total time period of ($\tau_{1d}+\tau_{2d}$). The change in relative velocity in the lower chart represents the target track differential value $dV_{trk}^*$, and the relative velocity dV converges to zero.

<Inter-Vehicle Distance Control Operation>

Figure 5:
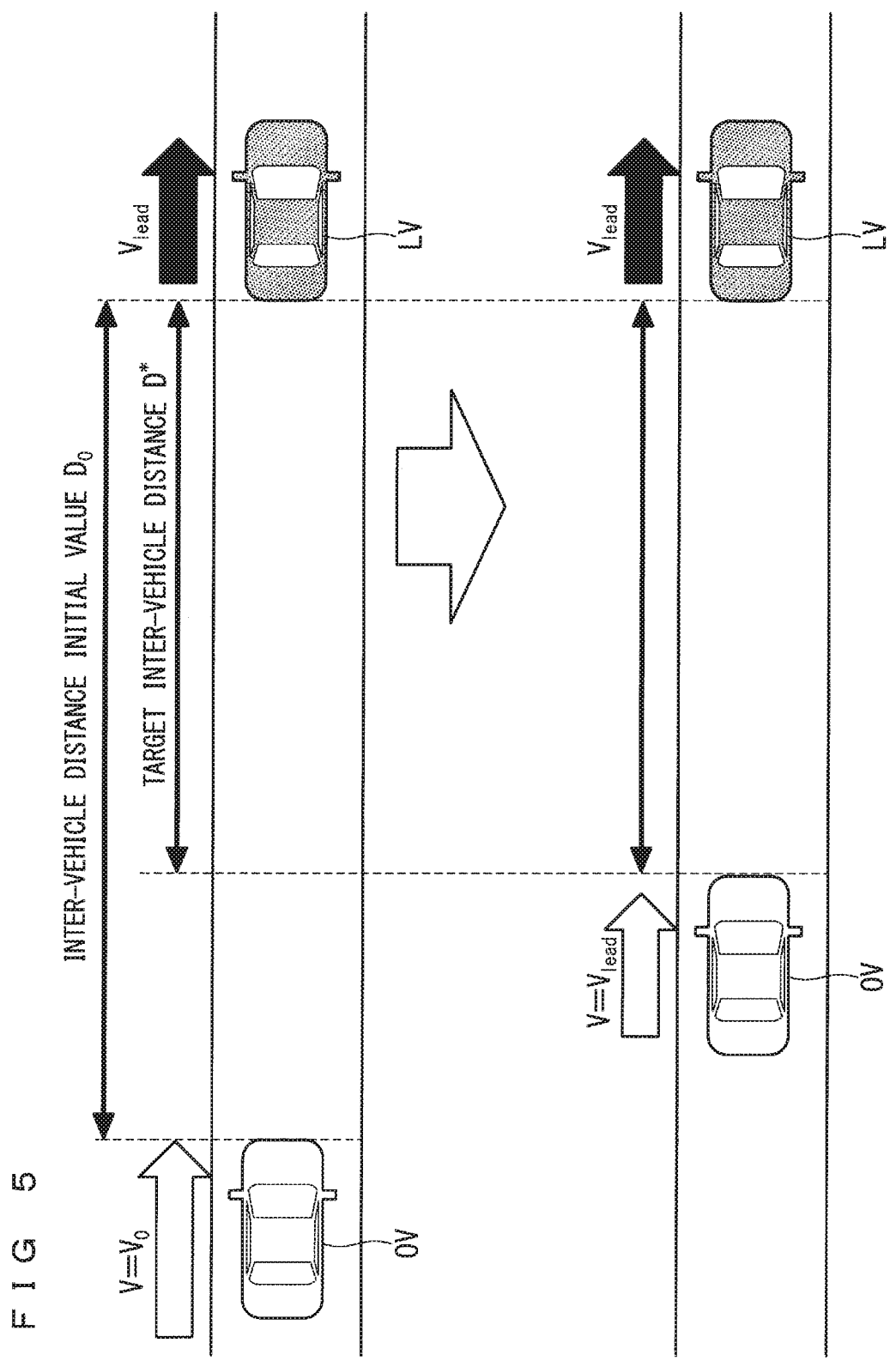
FIG. 5 illustrates a driving scene where the inter-vehicle distance control device performs control according to the first preferred embodiment of the present invention.

Next, an inter-vehicle distance control operation performed in each driving scene by the inter-vehicle distance control device 100 will be described based on simulation results. FIG. 5 illustrates a driving scene where a host vehicle OV approaches a distant, slow-moving preceding vehicle LV. In the initial state, an inter-vehicle distance initial value D0 is greater than the target inter-vehicle distance $D^*$, and the host vehicle velocity V is V0, which is greater than the preceding vehicle velocity $V_{lead}$. The host vehicle OV is controlled by the inter-vehicle distance control device 100 such that it approaches the preceding vehicle LV while decelerating to make the inter-vehicle distance equal to the target inter-vehicle distance $D^*$ and to make the host vehicle velocity V equal to the preceding vehicle velocity $V_{lead}$.

Figure 6:
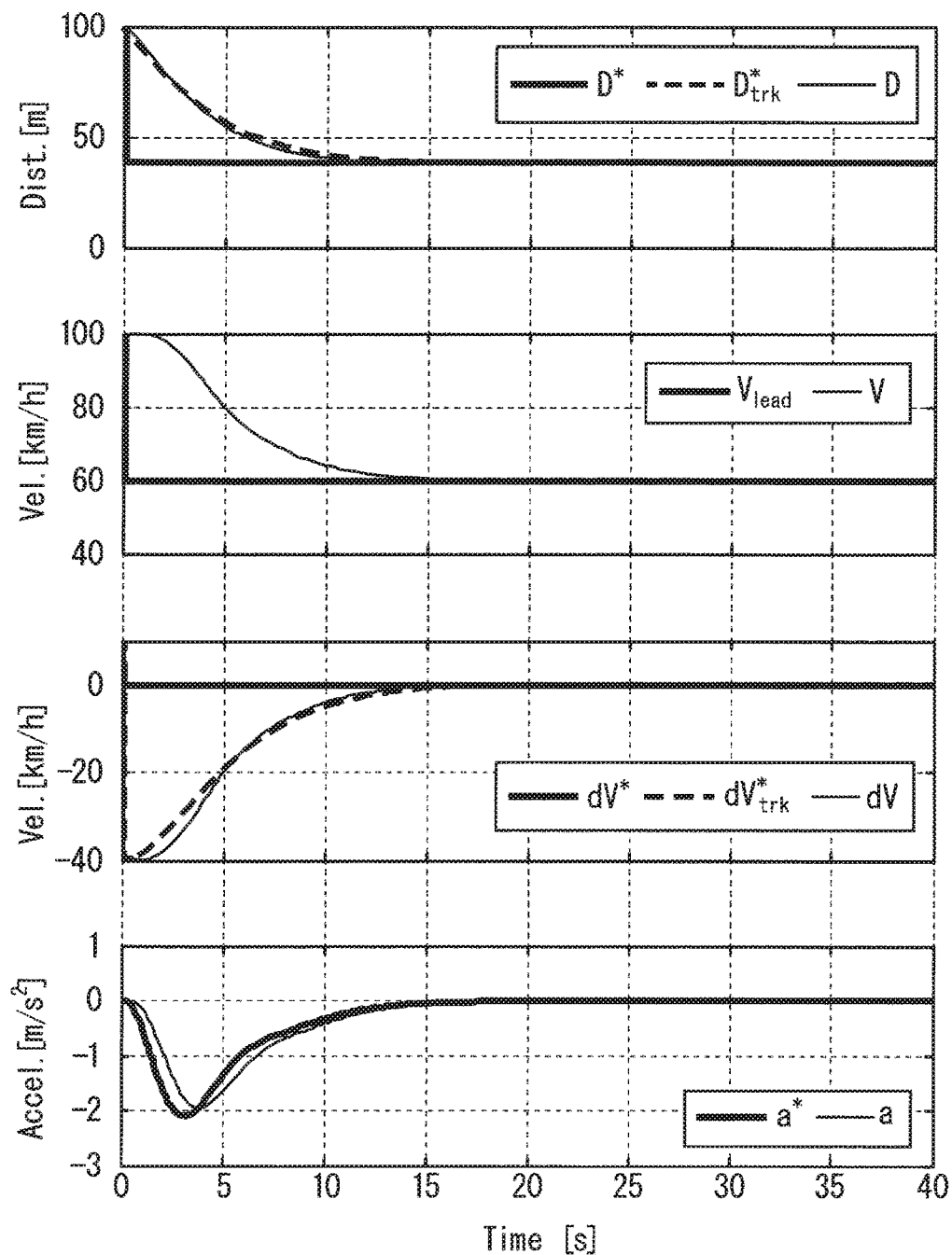
FIG. 6 illustrates simulation results obtained with the inter-vehicle distance control device according to the first preferred embodiment of the present invention.

FIG. 6 illustrates simulation results obtained with the inter-vehicle distance control device 100 in the driving scene in FIG. 5. FIG. 5 illustrates simulation results of the inter-vehicle distance (Dist.[m]), the velocity (Vel.[km/h]), the relative velocity (Vel.[km/h]), and the acceleration (Accel. [m/s$^2$]). The first section from the top illustrates a temporal change in inter-vehicle distance, the second section from the top illustrates a temporal change in velocity (absolute value), the third section from the top illustrates a temporal change in relative velocity, and the fourth section from the top illustrates a temporal change in acceleration [m/s$^2$]. In all of these charts, the horizontal axis indicates time (Time [s]). Note that a target relative velocity dV* is also illustrated in the temporal change in relative velocity in the third section, and the target relative velocity dV* is zero and constant.

In FIG. 6, the host vehicle OV approaches the preceding vehicle LV while decelerating, the inter-vehicle distance D converges from an initial value of 100 [m] to the target inter-vehicle distance D* of 40 [m], the host vehicle velocity V converges from 100 [km/h] to the preceding vehicle velocity $V_{lead}$ of 60 [km/h], and the relative velocity dV of zero. The target track $D_{trk}^*$ in the first section from the top of FIG. 6 and the target track differential value $dV_{trk}^*$ in the third section from the top are outputs of the target track generator 103, and the host vehicle velocity V in the second section from the top and the acceleration a of the host vehicle in the fourth section from the top are values obtained from the outputs of the target track generator 103.

In this simulation, the time constant of the two-stage moving-average filter of the target track generator 103 is set to $\tau_{1d}=\tau_{2d}=10$ [s]. Thus, the initial values converge to the target values for a time period of $\tau_{1d}+\tau_{2d}=20$ [s].

Figure 7:
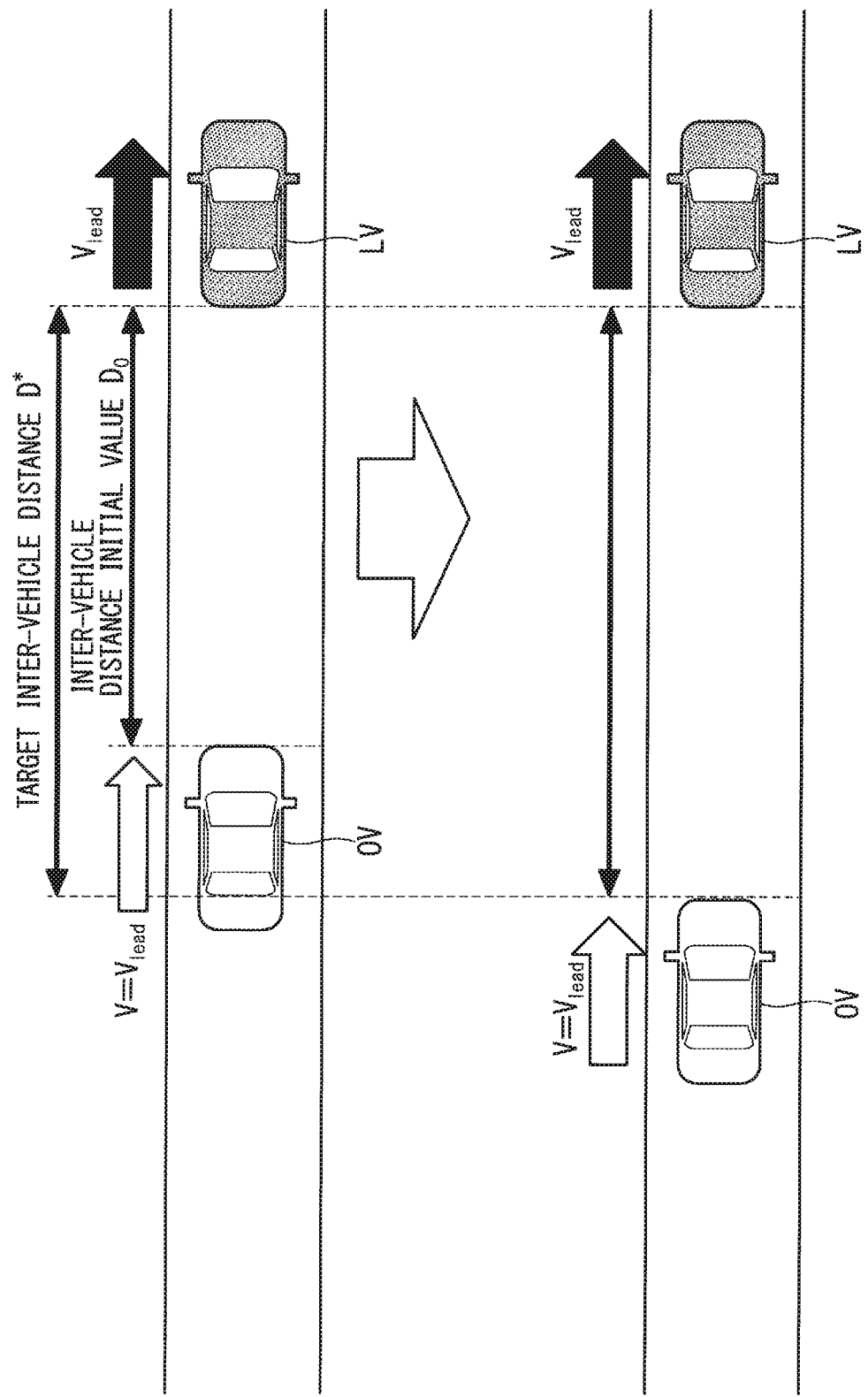
FIG. 7 illustrates a driving scene where the inter-vehicle distance control device performs control according to the first preferred embodiment of the present invention.

FIG. 7 illustrates a driving scene where the preceding vehicle LV running at same velocity cuts-in just in front of the host vehicle OV. In the initial state, the inter-vehicle distance initial value D0 is smaller than the target inter-vehicle distance D*, and the host vehicle velocity V is the same as the preceding vehicle velocity $V_{lead}$. The host vehicle OV is controlled by the inter-vehicle distance control device 100 such that it once decelerates to increase the inter-vehicle distance from the preceding vehicle LV and then accelerates again up to its original velocity.

Figure 8:
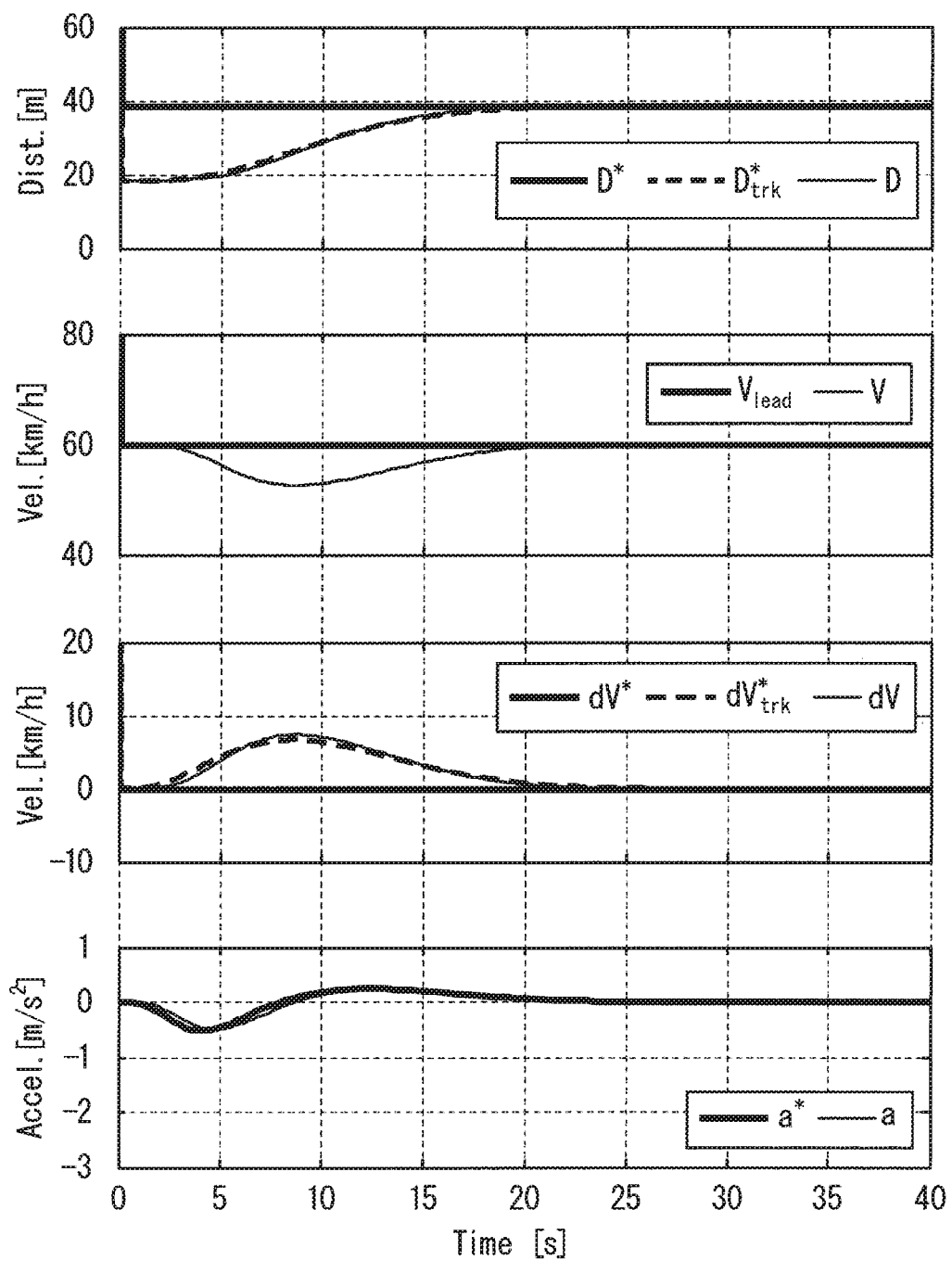
FIG. 8 illustrates simulation results obtained with the inter-vehicle distance control device according to the first preferred embodiment of the present invention.

FIG. 8 illustrates simulation results obtained with the inter-vehicle distance control device 100 in the driving scene in FIG. 7. Like FIG. 6, FIG. 8 illustrates temporal changes in inter-vehicle distance, velocity, relative velocity, and acceleration. In FIG. 8, the inter-vehicle distance D converges from an initial value of 20 [m] to the target inter-vehicle distance D* of 40 [m], and the host vehicle velocity V once decreases from 60 [km/h] to increase the inter-vehicle distance and then increases again up to the preceding vehicle velocity $V_{lead}$ of 60 [km/h]. The target track $D_{trk}^*$ in the first section from the top of FIG. 8 and the target track differential value $dV_{trk}^*$ in the third section from the top are outputs of the target track generator 103, and the host vehicle velocity V in the second section from the top and the acceleration a of the host vehicle in the fourth section from the top are values obtained from the outputs of the target track generator 103.

In this simulation, the time constant of the two-stage moving-average filter of the target track generator 103 is set to $\tau_{1d}=\tau_{2d}=10$ [s]. Thus, the initial values converge to the target values for a time period of $\tau_{1d}+\tau_{2d}=20$ [s].

As described above, according to the first preferred embodiment of the present invention, the two-stage moving-average filter of the target track generator 103 can define the target track $D_{trk}^*$ and the target track differential value $dV_{trk}^*$ as the time history lasting until the inter-vehicle distance D converges to the target inter-vehicle distance D* and the relative velocity dV converges to zero. Then, the FB controller 104 generates the acceleration command a* so that the inter-vehicle distance D and the relative velocity dV match the target track $D_{trk}^*$ and the target track differential value $dV_{trk}^*$. Accordingly, the inter-vehicle distance D can be controlled according to the target track $D_{trk}^*$ defined by the two-stage moving-average filter.

Second Preferred Embodiment

<Device Configuration>

Figure 9:
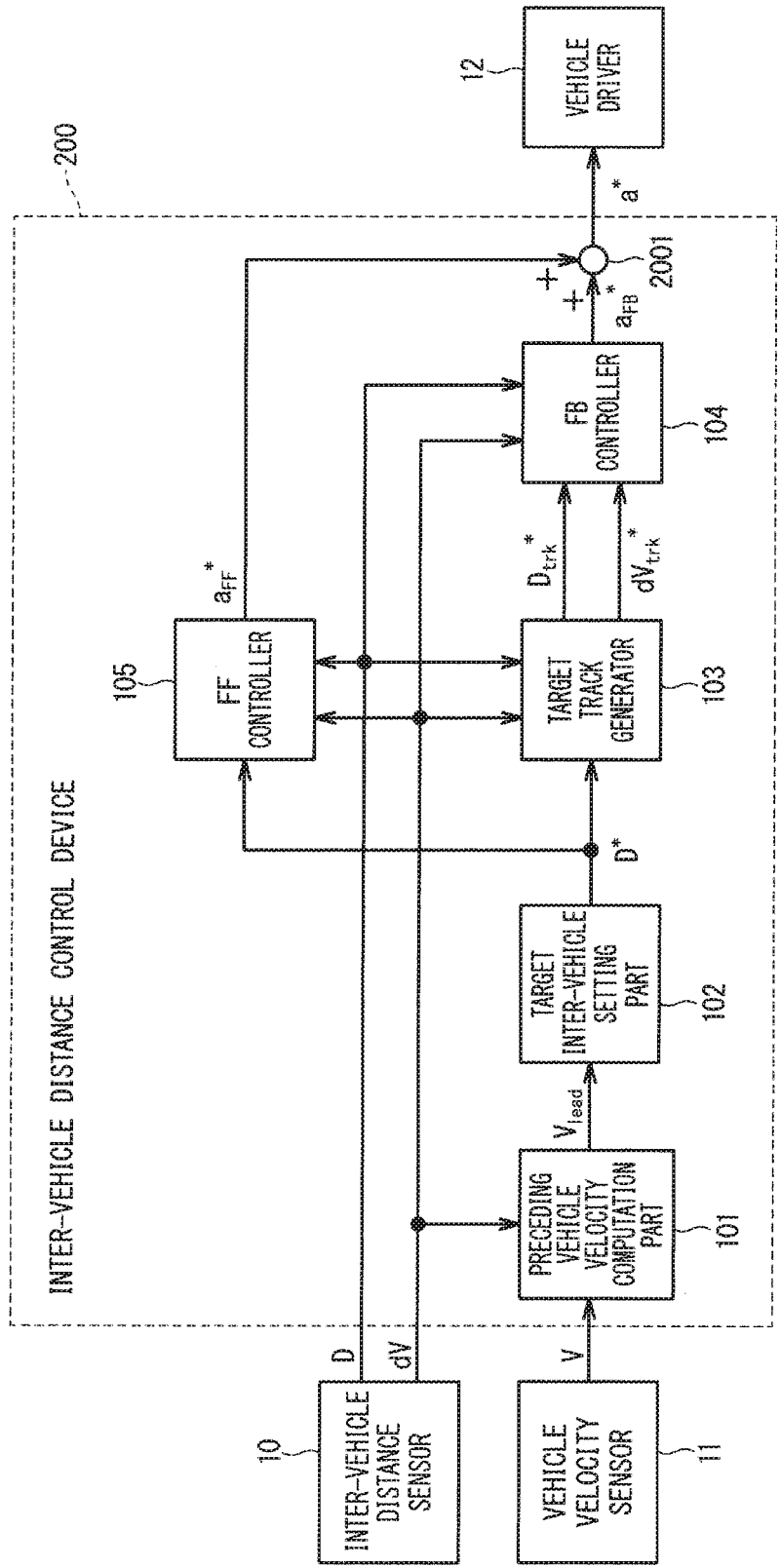
FIG. 9 is a block diagram illustrating a configuration of an inter-vehicle distance control device according to a second preferred embodiment of the present invention.

FIG. 9 is a functional block diagram illustrating a configuration of an inter-vehicle distance control device 200 according to a second preferred embodiment of the present invention. As illustrated in FIG. 9, the inter-vehicle distance control device 200 is configured to additionally include an FF controller 105 in the configuration of the inter-vehicle distance control device 100 of the first preferred embodiment illustrated in FIG. 1. The FF controller 105 receives input of the inter-vehicle distance D and the relative velocity dV which are output from the inter-vehicle distance sensor 10, and input of the target inter-vehicle distance D* which is output from the target inter-vehicle setting part 102, and computes a feedforward acceleration command $a_{FF}^*$.

The feedback acceleration command $a_{FB}^*$ which is the output of the FB controller 104 and the feedforward acceleration command $a_{FF}^*$ which is the output of the FF controller 105 are added by an adder 2001. Thus, the acceleration command a* which is the output of the inter-vehicle distance control device 200 is a sum of the feedback acceleration command $a_{FB}^*$ and the feedforward acceleration command $a_{FF}^*$.

<Operations>

Hereinafter, operations of the inter-vehicle distance control device 200 will be described. The FF controller 105 uses a feedforward method to compute the acceleration command $a_{FF}^*$ for following the target track.

The arithmetic expression of the acceleration command $a_{FF}^*$ used in the FF controller 105 is defined by a transfer function $C_{FF}(s)$ using the target inter-vehicle distance D* as an input, as given by Expression (11) below.

$$a_{FF}^* = C_{FF}(s) D^* \quad (11)$$

Note that the input of the FF controller 105 is given as a step input from the inter-vehicle distance D to the target inter-vehicle distance D*, where the initial value of the input is set to the inter-vehicle distance D, the initial value of the input differential value is set to the relative velocity dV, and the target inter-vehicle distance D* is used as an input.

The transfer function $C_{FF}(s)$ of the FF controller 105 is given by Expression (12) below, using the transfer function $F_{dref}(s)$ of the two-stage moving-average filter of the target track generator 103 and an inverse transfer function $(1/P(s))$ that is the reciprocal of a transfer function $P(s)$ of the vehicle driver 12 that is to be controlled by the inter-vehicle distance control device 200.

$$C_{FF}(s) = \frac{F_{dref}(s)}{P(s)} \quad (12)$$

The transfer function $P(s)$ of the vehicle driver 12 is given by Expression (13) below. The transfer function $P(s)$ is a transfer function until the inter-vehicle distance D is achieved upon receipt of the acceleration command a*.

$$P(s) = \frac{D(s)}{a^*(s)} \quad (13)$$

A relationship between the acceleration command a* and the acceleration a is given by Expression (14) below. This corresponds to the control response of the vehicle driver 12 and is defined as a first-order lag system (first-order low pass filter) having a time constant $T_{VEH}$.

$$a = \frac{1}{T_{VEH}s + 1} a^* \quad (14)$$

A relationship between the inter-vehicle distance D and the acceleration a of the host vehicle when the preceding vehicle velocity $V_{lead}$ is assumed to be constant is given by Expression (15) below.

$$D = -\frac{1}{s^2} a \quad (15)$$

From Expressions (13) to (15) above, the transfer function $P(s)$ of the vehicle driver 12 to be controlled by the inter-vehicle distance control device 200 is defined by Expression (16) below.

$$P(s) = -\frac{1}{s^2} \frac{1}{T_{VEH}s + 1} \quad (16)$$

Then, the transfer function $F_{dref}(s)$ of the two-stage moving-average filter of the target track generator 103 given by Expression (8) and the transfer function $P(s)$ of the vehicle driver 12 given by Expression (16) are substituted into Expression (12), so that the transfer function $C_{FF}(s)$ of the FF controller 105 is given by Expression (17) below.

$$C_{FF}(s) = -\left[\frac{6s(T_{VEH}s + 1)}{\tau_{1d}^2 s^2 + 6\tau_{1d}s + 12}\right]\left[\frac{6s}{\tau_{2d}^2 s^2 + 6\tau_{2d}s + 12}\right] \quad (17)$$

The acceleration command a* which is the output of the inter-vehicle distance control device 200 is computed as a sum of the feedback acceleration command $a_{FB}^*$ and the feedforward acceleration command $a_{FF}^*$ from Expression (18) below $$a^* = a_{FB}^* + a_{FF}^* \quad (18)$$

<Inter-Vehicle Distance Control Operation>

Next, inter-vehicle distance control operations performed in each driving scene by the inter-vehicle distance control device 200 will be described based on simulation results. The deriving scene as used herein is assumed to be the driving scene described with reference to in FIG. 5 in which the host vehicle OV approaches the distant, slow-moving preceding vehicle LV.

Figure 10:
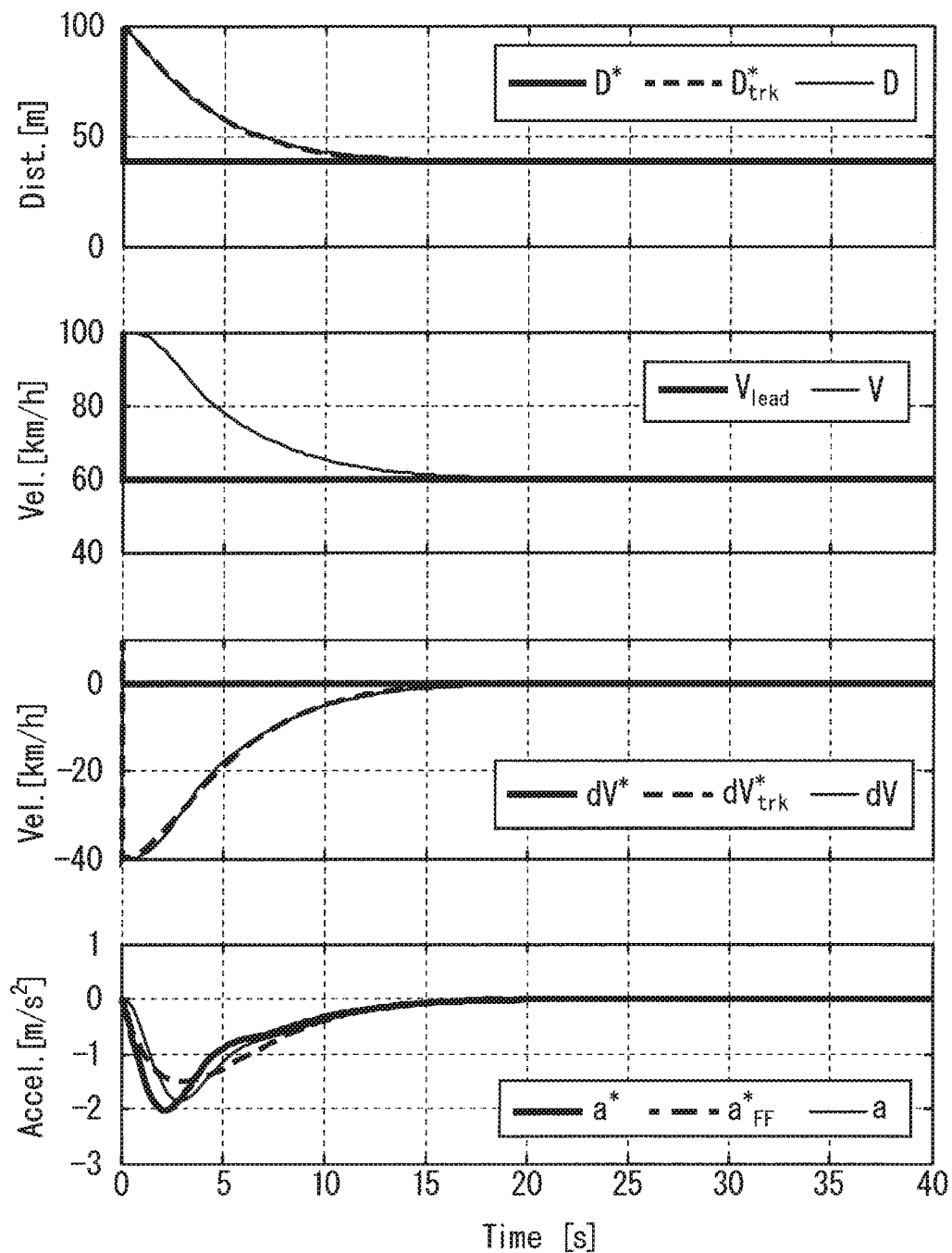
FIG. 10 illustrates simulation results obtained with the inter-vehicle distance control device according to the second preferred embodiment of the present invention.

FIG. 10 illustrates simulation results obtained with the inter-vehicle distance control device 200 in the driving scene in FIG. 5. FIG. 10 illustrates simulation results of the inter-vehicle distance, the velocity, the relative velocity, and the acceleration, and charts are arranged in the same manner as in the simulation results described above.

In FIG. 10, the host vehicle OV approaches the preceding vehicle LV while decelerating, the inter-vehicle distance D converges from an initial value of 100 [m] to the target inter-vehicle distance D* of 40 [m], the host vehicle velocity V converges from 100 [km/h] to the preceding vehicle velocity $V_{lead}$ of 60 [km/h], and the relative velocity dV of the preceding vehicle using the host vehicle as a reference converges from −40 [km/h] to zero.

A temporal change in acceleration the fourth section from the top of FIG. 10 illustrates the feedback acceleration command $a_{FF}*$ as a breakdown of the acceleration command a*.

In the inter-vehicle distance control device 200, the feedforward acceleration command $a_{FF}*$ for following the target track $D_{trk}*$ is computed by computing the transfer function $C_{FF}(s)$ of the FF controller 105, using the transfer function. $F_{dref}(s)$ of the target track generator 103 and the transfer function P(s) of the vehicle driver 12 to be controlled. This reduces the ratio of the feedback acceleration command $a_{FB}*$ to the entire acceleration command a*.

As described above, in the inter-vehicle distance control device 200 according to the second preferred embodiment of the present invention, an acceleration command is also generated under feedforward control, in addition to under feedback control, in order to allow the FF controller 105 to control the inter-vehicle distance according to the target track $D_{trk}*$. Thus, even if the feedback gain of the FB controller 104 is lowered, it is possible to ensure responsiveness of inter-vehicle distance control.

The feedback gain defines sensitivity to the relative velocity of the preceding vehicle and the inter-vehicle distance, i.e., the degree of acceleration when the relative velocity and the inter-vehicle distance have changed. Thus, lowering the feedback gain suppresses fluctuations in velocity and acceleration when the host vehicle runs following the preceding vehicle.

The components of the inter-vehicle distance control device 200 described above can be configured using a computer, and each of these components is implemented by the computer executing programs. That is, the inter-vehicle distance control device 200 illustrated in FIG. 9 is implemented by, for example, the processing circuit 20 illustrated in FIG. 2. Also, when the inter-vehicle distance control device 200 illustrated in FIG. 9 is configured using a processor, its hardware configuration is as illustrated in FIG. 3.

Third Preferred Embodiment

<Device Configuration>

Figure 11:
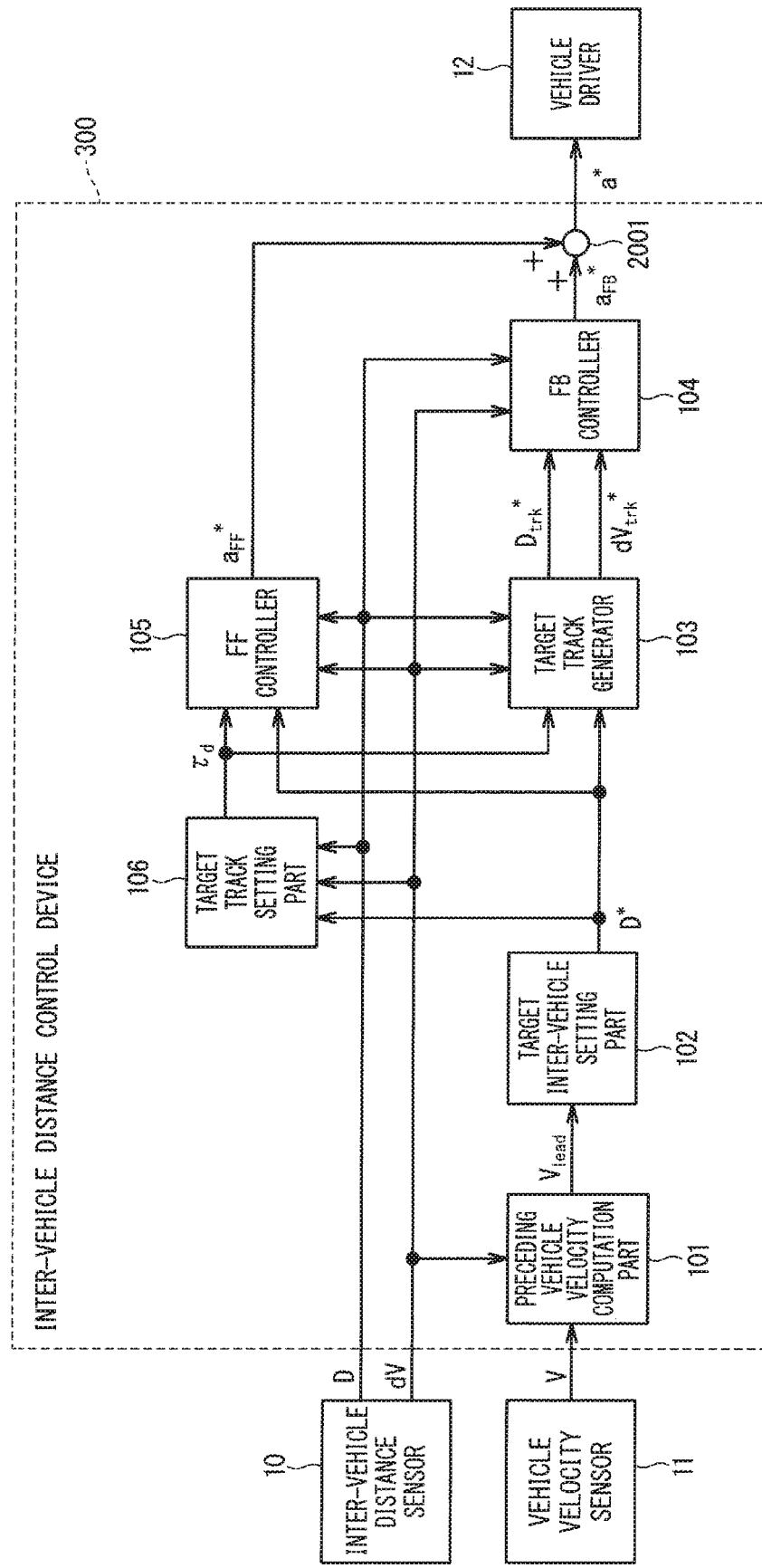
FIG. 11 is a block diagram illustrating a configuration of an inter-vehicle distance control device according to a third preferred embodiment of the present invention.

FIG. 11 is a functional block diagram illustrating a configuration of an inter-vehicle distance control device 300 according to a third preferred embodiment of the present invention. As illustrated in FIG. 11, the inter-vehicle distance control device 300 is configured to additionally include a target track design part 106 in the configuration of the inter-vehicle distance control device 200 of the second preferred embodiment illustrated in FIG. 9. The target track design part 106 receives, as conditions for following the vehicles, input of the inter-vehicle distance D and the relative velocity dV which are output from the inter-vehicle distance sensor 10 and input of the target inter-vehicle distance D* output from the target inter-vehicle setting part 102, and computes and inputs a filter time constant $\tau_d$ to the target track generator 103 and the FF controller 105.

Here, the filter time constant $\tau_d$ is assumed to be computed only at the start of control (e.g., when the preceding vehicle is detected) by the target track design part 106 and always held at the previous value after the start of control. Thus, the hater-vehicle distance D and the relative velocity dV used in the target track design part 106 refer to the initial values of the inter-vehicle distance D and the relative velocity dV at the start of control.

<Operations>

Hereinafter, operations of the inter-vehicle distance control device 300 will be described. In inter-vehicle distance control, the driver's ride comfort improves as the magnitude of deceleration decreases. However, if priority is given to mild deceleration, the host vehicle may approach the preceding vehicle too close and give a sense of unease to the driver. In view of this, the target track design part 106 is provided and the following two design objectives are taken into consideration in inter-vehicle distance control so as to make compatible both improvement in ride comfort and suppression of uneasiness.

Design Objective (1): to reduce the magnitude of acceleration or deceleration during a vehicle-following process;

Design Objective (2): to increase the closest approach distance during, the vehicle-following process The term "vehicle-following process" as used in the aforementioned design objectives refers to a process from when the inter-vehicle distance control is started to when the inter-vehicle distance and the host vehicle velocity converge respectively to the target inter-vehicle distance and the preceding vehicle velocity, and the term "closest approach distance" as used herein refers to a minimum value of the inter-vehicle distance during the vehicle-following process.

Figure 12:
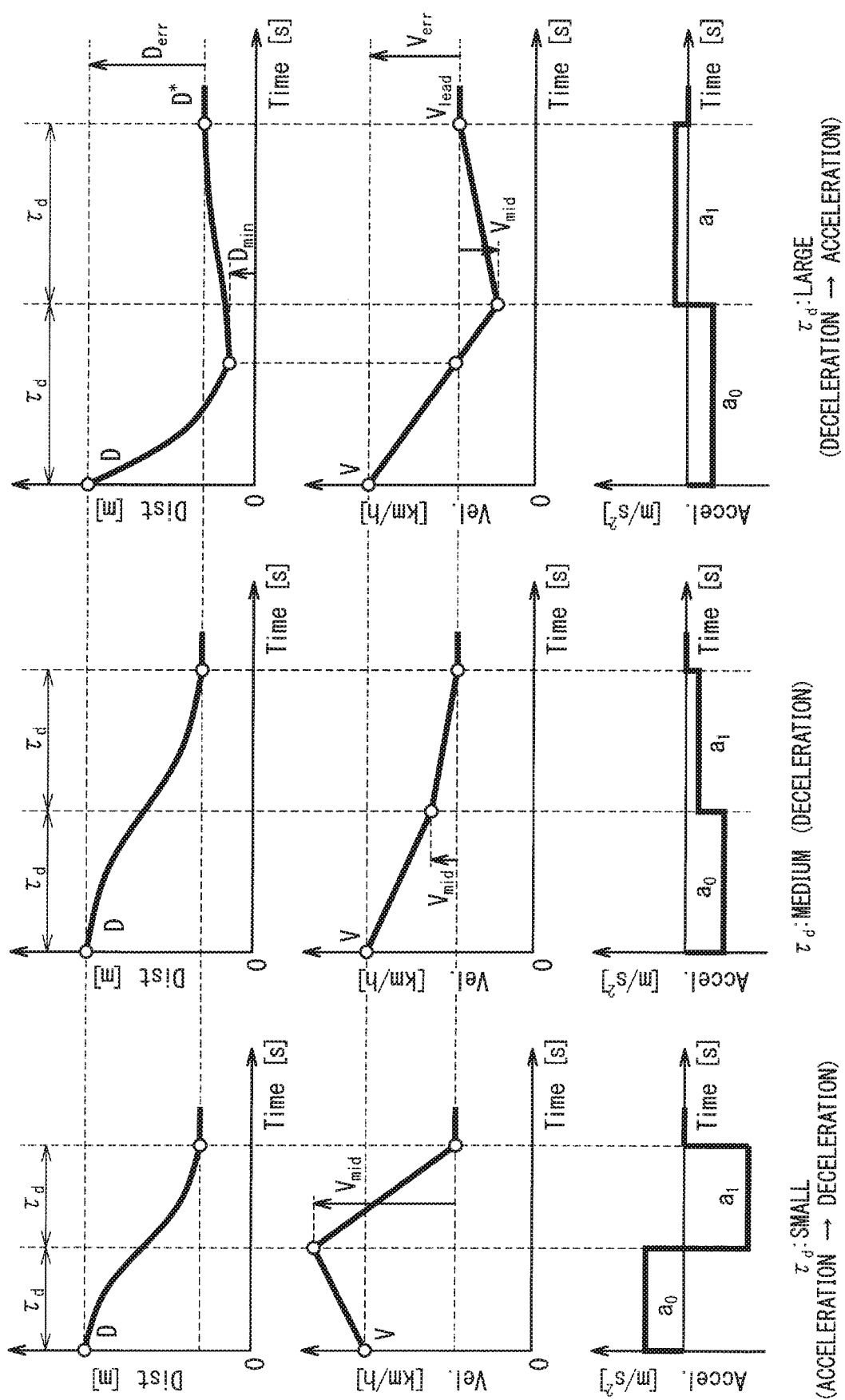
FIG. 12 illustrates a relationship between a filter time constant and a target track in a target track design part according to the third preferred embodiment of the present invention.

FIG. 12 illustrates a relationship between the target track $D_{trk}*$ and the filter time constant $\tau_d$ output from the target track design part 106, and control is performed in the driving scene described with reference to FIG. 5 in which the host vehicle OV approaches the distant, slow-moving preceding vehicle LV.

FIG. 12 illustrates the inter-vehicle distance (Dist.), the velocity (Vel.)), and the acceleration (Accel.) for cases where the time constant $\tau_d$ is small, where the time constant $\tau_d$ is about an intermediate value, and where the time constant $\tau_d$ is large in order from the left, with the assumption that the initial value of the inter-vehicle distance, the initial value of the relative velocity, anal the target inter-vehicle distance remain the same. The uppermost section in FIG. 12 illustrates a temporal change in inter-vehicle distance [m], the middle section illustrates a temporal change in velocity [km/h], and the lowermost section illustrates a temporal change in acceleration [m/s²]. In FIG. 12, a difference in velocity from the host vehicle using the preceding vehicle as a reference is illustrated as a velocity deviation $V_{err}$, a difference between the target inter-vehicle distance D* and the inter-vehicle distance D is illustrated as a target inter-vehicle deviation $D_{err}$, and a velocity at time $\tau_d$ is illustrated as an intermediate velocity $V_{mid}$. Also, in FIG. 12, acceleration during the first half of the time period $\tau_d$ is illustrated as $a_0$, and acceleration during the second half of the tune period $\tau_d$ as $a_1$.

As illustrated in FIG. 12, irrespective of the time constant $\tau_d$, it takes a time period of $2 \times \tau_d$ for the inter-vehicle distance D to converge to the target inter-vehicle distance D* and for the host vehicle velocity V to converge to the preceding vehicle velocity $V_{lead}$. More specifically, in the case where the filter time constant $\tau_d$ is set to a small value, a short-time convergence to the target values is required and therefore a target track is designed such that the host vehicle accelerates for a time period $\tau_d$ corresponding to the time constant to reduce the inter-vehicle distance and then decelerates for another time period $\tau_d$. In the case where the filter time constant $\tau_d$ is set to about an intermediate value, more time is taken for convergence to the target values and therefore a target track is designed such that the host vehicle reduces the inter-vehicle distance while decelerating for a time period of $2\times\tau_d$. In the case where the filter time constant $\tau_d$ is set to a large value, the longest time is taken for convergence to the target values and therefore a target track is designed such that the host vehicle once approaches the preceding vehicle at a distance shorter than the target inter-vehicle distance and then gradually increases the inter-vehicle distance. In this way, different target tracks can be designed depending on the magnitude of the filter time constant $\tau_d$ according to the present embodiment.

Next, relationships between the filter time constant $\tau_d$ and both of the velocity and the inter-vehicle distance will be described. First, the velocity deviation $V_{err}$ which is a difference in velocity from the host vehicle velocity V using the preceding vehicle velocity $V_{lead}$ as a reference, and the target inter-vehicle deviation $D_{err}$ which is a deviation of the inter-vehicle distance D from the target inter-vehicle distance D* are given respectively by Expressions (19) and (20) below. As given by Expression (19), the velocity deviation $V_{err}$ is a relative velocity of the host vehicle, viewed from the preceding vehicle, and is a value obtained by inverting the positive and negative values of the relative velocity dV of the preceding vehicle.

$$V_{err} = -dV \quad (19)$$

$$D_{err} = D - D^* \quad (20)$$

The relationships given by Expressions (21), (22), and (23) below hold true among the inter-vehicle distance, the velocity, the acceleration, and the filter time constant $\tau_d$ illustrated in FIG. 12.

$$V_{mid} = V_{err} + a_0 \tau_d \quad (21)$$

$$0 = V_{mid} + a_1 \tau_d \quad (22)$$

$$D_{err} = (V_{err}\tau_d + \tfrac{1}{2}a_0\tau_d^2) + (V_{mid}\tau_d + \tfrac{1}{2}a_1\tau_d^2) \quad (23)$$

When Expressions (21) to (23) are rearranged, the time constant $\tau_d$ is calculated from Expression (24) below. This indicates that, if the acceleration $a_0$ is determined, the filter time constant $\tau_d$ can be computed from the deviations of the inter-vehicle distance and the velocity from their target values.

$$\tau_d = \frac{-3V_{err} \pm \sqrt{9V_{err}^2 + 16a_0 D_{err}}}{4a_0} \quad (24)$$

Next, the closest approach distance in the target track will be described. In FIG. 12, if the inter-vehicle distance in the case where the filter time constant $\tau_d$ is set to a large value and when the host vehicle approaches the closest point to the preceding vehicle, i.e., a minimum value of the inter-vehicle distance during the vehicle-following process, is assumed to be a closest approach distance $D_{min}$, the relationship given by Expression (25) below holds true between the closest approach distance $D_{min}$ and the magnitude $a_0$ of an average value of acceleration (deceleration) during the first half of the vehicle-following process.

$$a_0 = -\frac{V_{err}^2}{2(D - D_{min})} \quad (25)$$

Expression (25) indicates that the acceleration (deceleration) increases as the closest approach distance $D_{min}$ increases, and that the suppression of deceleration, i.e., the design objective (1), cannot be achieved if priority is given to the design objective (2).

Expressions (24) and (25) indicate that the filter time constant $\tau_d$ can be computed if the desired closest approach distance $D_{min}$ is determined.

Here, design values $D_{set1}$ and $D_{set2}$ ($0 < D_{set2} \leq D_{set1}$) for the closest approach distance and design values $a_{set0}$, $a_{set1}$, $a_{set2}$, and $a_{set3}$ ($a_{set3} \leq a_{set2} \leq a_{set1} < 0 < a_{set0}$) for the acceleration are defined as design parameters.

Inter-vehicle-keeping decelerations $a_{brk1}$ and $a_{brk2}$ when the closest approach distance $D_{min}$ takes the design values $D_{set1}$ and $D_{set2}$ during the vehicle-following process can be obtained respectively from Expressions (26) and (27) below.

$$a_{brk1} = -\frac{V_{err}^2}{2 \times \max(\Delta D, D - D_{set1})} \quad (26)$$

$$a_{brk2} = -\frac{V_{err}^2}{2 \times \max(\Delta D, D - D_{set2})} \quad (27)$$

The max operations expressed by the max functions in the denominators of Expressions (26) and (27) indicate exception handling performed respectively when the initial value of the inter-vehicle distance D is smaller than the design value $D_{set1}$ and when the initial value of the inter-vehicle distance D is smaller than the design value $D_{set2}$. That is, an infinitesimal distance $\Delta D$ is a design parameter and indicates that, when the initial value of the inter-vehicle distance D is smaller than the design value, the host vehicle is allowed to approach the preceding vehicle by the infinitesimal distance $\Delta D$ from the initial value of the inter-vehicle distance D.

FIG. 13 illustrates the final acceleration design value $a_{plan}$ [m/s²] that is determined by magnitude relationships of the inter-vehicle-keeping deceleration ($a_{brk1}$, $a_{brk2}$) and the acceleration design values ($a_{set0}$, $a_{set1}$, $a_{set2}$, $a_{set3}$), using a design technique of the present invention that gives consideration to both of the design objectives, i.e., improvement in ride comfort and suppression of uneasiness, during the vehicle-following process.

FIG. 13 illustrates No. 1 to No. 6 conditions and the final acceleration design values $a_{plan}$ corresponding to these conditions, and higher priority is given in ascending order from No. 1 to No. 6. If a higher-priority condition is not satisfied, determination is made under a lower-priority condition. As the priority of the condition becomes lower, the final acceleration design value $a_{plan}$ increases in the negative direction and the degree of deceleration increases.

In the case where the preceding vehicle runs faster than the host vehicle, the No. 1 condition in FIG. 13, i.e., $V_{err} < 0$, is satisfied, and the filter time constant $\tau_d$ is calculated using the positive acceleration design values $a_{set0}$.

On the other hand, in the case where the host vehicle runs faster than the preceding vehicle and the velocity deviation $V_{err}$ is small or the inter-vehicle distance D is large, the No. 2 condition, i.e., $V_{err} \geq 0$ and $a_{set1} \leq a_{brk1}$, is satisfied, and the filter time constant $\tau_d$ is calculated using the design value $a_{set1}$ with the smallest deceleration.

In the case where the host vehicle runs faster than the preceding vehicle and the velocity deviation $V_{err}$ is large or the inter-vehicle distance D is small, the No. 3 condition, i.e., $V_{err} \geq 0$ and $a_{set2} \leq a_{brk1} < a_{set1}$, is satisfied, and the filter time constant $\tau_d$ is calculated using the inter-vehicle-keeping deceleration $a_{brk1}$. In this case, the closest approach distance $D_{min}$ is the design value $D_{set1}$.

The No. 4 condition is $V_{err} \geq 0$ and $a_{brk2} \leq a_{set2} < a_{brk1}$. If this condition is satisfied, the filter time constant $\tau_d$ is calculated using the design value $a_{set2}$ with the second smallest deceleration.

The No. 5 condition is $V_{err} \geq 0$ and $a_{set3} \leq a_{brk2} < a_{set2}$. If this condition is satisfied, the filter time constant $\tau_d$ is calculated using the inter-vehicle-keeping deceleration $a_{brk2}$. In this case, the closest approach distance $D_{min}$ is the design value $D_{set2}$.

The No. 6 condition is $V_{err} \geq 0$ and $a_{brk2} < a_{set3}$. If this condition is satisfied, the filter time constant $\tau_d$ is calculated using the design value $a_{set3}$ with the third smallest deceleration.

As described above, if one of the No. 1, No. 2, No. 4, and No. 6 conditions in FIG. 13 is satisfied, the filter time constant $\tau_d$ is calculated such that the average value of acceleration or deceleration during the first half of the vehicle-following process becomes the final acceleration design value. If either the No. 3 or No. 5 condition is satisfied, the filter time constant $\tau_d$ is calculated such that the closest approach distance during the vehicle-following process becomes the closest approach distance design value.

FIG. 14 illustrates the results of determination as to whether the final acceleration design value $a_{plan}$ is greater than or equal to each acceleration design value $a_{set}*(a_{set0}, a_{set1}, a_{set2}, a_{set3})$ and the results of determination as to whether the closest approach distance $D_{min}$ is greater than or equal to each closest approach distance design value $D_{set}*$ ($D_{set1}$, $D_{set2}$) in the case of using the final acceleration design value illustrated in FIG. 13.

For example, in the case of using the final acceleration design value under the No. 1 condition $a_{plan}=a_{set0}$), the final acceleration design value $a_{plan}$ achieves a value greater than or equal to all of the acceleration design values $a_{set}*$, and the closest approach distance $D_{min}$ under the No. 1 condition achieves a value greater than or equal to all of the closest approach distance design values $D_{set}*$.

In the case of using the final acceleration design value under the No. 2 condition ($a_{plan}=a_{set1}$), the final acceleration design value $a_{plan}$ achieves a value greater than or equal to all the acceleration design values $a_{set}*$ other than the acceleration design values $a_{set0}$, and the closest approach distance $D_{min}$ under the No. 2 condition achieves a value greater than or equal to all of the closest approach distance design values $D_{set}*$.

In the case of using the final acceleration design value under the No. 3 condition ($a_{plan}$ $a_{brk1}$), the final acceleration design value $a_{plan}$ achieves a value greater than or equal to all the acceleration design values $a_{set}*$ other than the acceleration design values $a_{set0}$ and $a_{set1}$, and the closest approach distance $D_{min}$ under the No. 3 condition achieves a value greater than or equal to all of the closest approach distance design values $D_{set}*$.

As described above, a higher-priority final acceleration design value achieves more conditions. With the design technique of the present invention, a plurality of design values is prepared for both of the acceleration and the closest approach distance, and the filter time constant $\tau_d$ is determined such that those design values match as many conditions as possible.

Accordingly, the response characteristics of the target track generator 103 can be determined in consideration of both increasing the closest approach distance and reducing the magnitude of acceleration (deceleration). The response characteristics of the target track generator can also be determined in consideration of both of the cases where the preceding vehicle runs faster than the host vehicle and where the preceding vehicle runs slower than the host vehicle.

<Inter-Vehicle Distance Control Operation>

Next, inter-vehicle distance control operations performed in each driving scene by the inter-vehicle distance control device 300 will be described based on simulation results.

FIG. 15 illustrates the acceleration design value, the closest approach distance design value, and the infinitesimal distance design value that are design parameters of the target track design part 106 used in this simulation. Each parameter is set such that the closest approach distance satisfies $0 < D_{set2} \leq D_{set1}$ and the acceleration satisfies $a_{set3} \leq a_{set2} \leq a_{set1} < 0 < a_{set0}$.

More specifically, the acceleration design values $a_{set0}$, $a_{set1}$, $a_{set2}$, and $a_{set3}$ (in units of m/s$^2$) are respectively +0.5, −0.2, −0.5, and −0.4 and applied respectively for acceleration, small deceleration, medium deceleration, and large deceleration.

The closest approach distance design values $D_{set1}$ and $D_{set2}$ (in units of are respectively max (D*, $D_{set2}$) and 20. The infinitesimal distance design value $\Delta D$ (in units of m) is 5.

Figure 16:
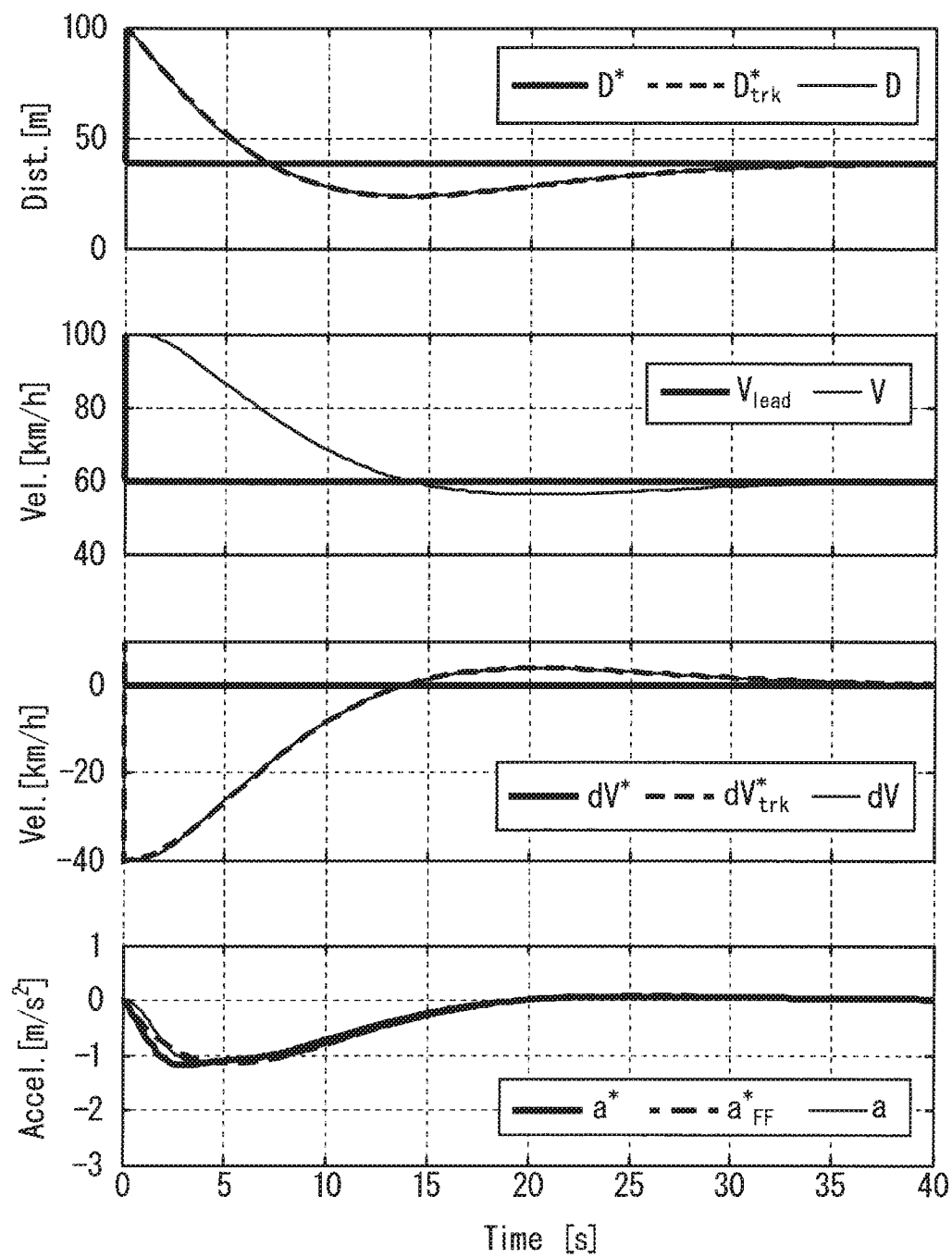
FIG. 16 illustrates simulation results obtained with the inter-vehicle distance control device according to the third preferred embodiment of the present invention.

FIG. 16 illustrates simulation results of the inter-vehicle distance, the velocity, the relative velocity, and the acceleration, and charts are arranged in the same manner as in the simulation results described above. The driving scene as used herein is assumed to be the driving scene described with reference to FIG. 5 in which the host vehicle OV approaches the distant, slow-moving preceding vehicle LV.

In FIG. 16, the host vehicle OV approaches the preceding vehicle LV while decelerating, and the inter-vehicle distance D decreases from an initial value of 100 [m] to approximately 20 [m] and then increases and converges to the target inter-vehicle distance D* of 40 [m]. The host vehicle velocity V gradually decreases from 100 [km/h] to approximately 55 [km/h] and then increases and converges to the preceding vehicle velocity $V_{lead}$ of 60 [km/h.]

Here, the target track design part 106 designs the target track to satisfy the equation, i.e., closest approach distance $D_{min}$=design value $D_{set2}$=20 [m]. Thus, the minimum value of the temporal change in the inter-vehicle distance D becomes 20[m], and the inter-vehicle distance D can be controlled as designed. Note that since the filter time constant $\tau_{1d}$ is equal to $\tau_{2d}=\tau_d=17$ [s], the initial values converge to the target values for a time period of $\tau_{1d}+\tau_{2d}$=approx. 34 [s].

As described above, in the inter-vehicle distance control device 300 according to the third preferred embodiment of the present invention, the target track design part 106 computes the filter time constant $\tau_d$ for reducing the magnitude of acceleration or deceleration during the vehicle-following process and increasing the closest approach distance during the vehicle-following process. Thus, it is possible to make variable the response characteristics of the filter that defines the target track $D_{trk}*$ and the target track differential value $dV_{trk}*$ and to design a target track that achieves both the improvement in ride comfort as a result of suppressing deceleration and the suppression of uneasiness as a result of increasing the closest approach distance.

Moreover, the target track can be designed such that the magnitude of deceleration or the closest approach distance during the vehicle-following process becomes a desired value. Then, the inter-vehicle distance can be controlled according to the target track $D_{trk}*$ under feedback and feedforward control.

The components of the inter-vehicle distance control device 300 described above can be configured using a computer, and each of these components is implemented by the computer executing programs. That is, the inter-vehicle distance control device 300 illustrated in FIG. 11 can be implemented by, for example, the processing circuit 20 illustrated in FIG. 2. Also, when the inter-vehicle distance control device 300 illustrated in FIG. 11 is configured using a processor, its hardware configuration is as illustrated in FIG. 3.

Fourth Preferred Embodiment

<Device Configuration>

Figure 17:
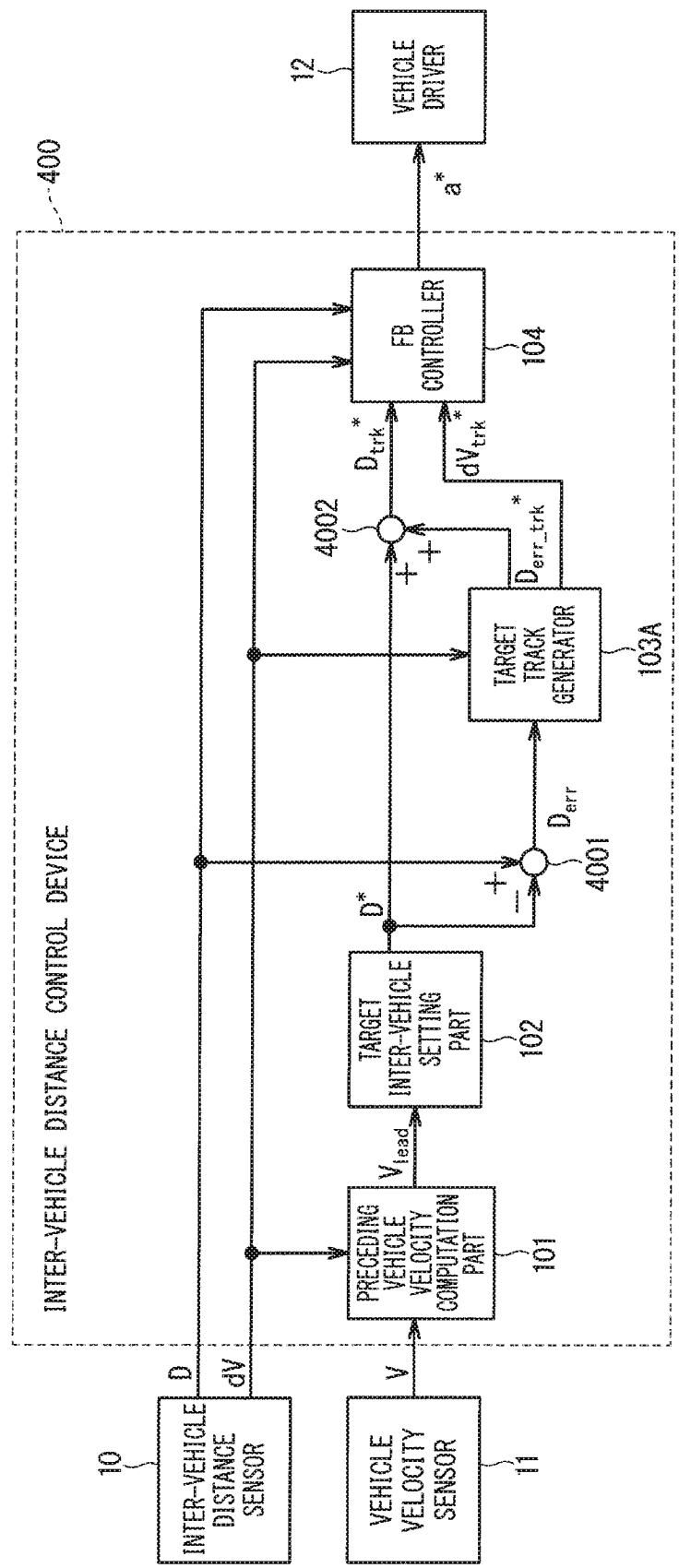
FIG. 17 is a block diagram illustrating a configuration of an inter-vehicle distance control device according to a fourth preferred embodiment of the present invention.

FIG. 17 is a functional block diagram illustrating a configuration of an inter-vehicle distance control device 400 according to a fourth preferred embodiment of the present invention. As illustrated in FIG. 17, the inter-vehicle distance control device 400 includes the preceding vehicle velocity computation part 101, the target inter-vehicle setting part 102, a target track generator 103A, and the FB controller 104. Note that components in FIG. 17 that are identical to those of the inter-vehicle distance control device 100 described with reference to FIG. 1 are given the same reference numerals, and redundant description thereof has been omitted.

The target track generator 103A generates a deviation track $D_{err\_trk}*$ and the target track differential value $dV_{trk}*$ on the basis of the relative velocity dV and an inter-vehicle deviation $D_{err}$ that is obtained by a subtractor 4001 subtracting the target inter-vehicle distance D* from the inter-vehicle distance D. The deviation track $D_{err\_trk}*$ defines a time history lasting until the inter-vehicle deviation $D_{err}$ converges to zero.

The FB controller 104 generates and inputs the acceleration command a* to the vehicle driver 12 on the basis of the inter-vehicle distance D, the relative velocity dV, the target track differential value $dV_{trk}*$, and a target track $D_{trk}*$ that is obtained by an adder 4002 adding the target inter-vehicle distance D* and the deviation track $D_{err\_trk}*$.

<Operations>

Next, an operation of each component of the inter-vehicle distance control device 400 will be described in detail. In the target track generator 103 of the inter-vehicle distance control device 100 according to the first preferred embodiment, the target inter-vehicle distance D* is input to the two-stage moving-average filter $F_{dref}(s)$, where the initial value of the input is set to the inter-vehicle distance D and the initial value of the input differential value is set to the relative velocity dV. In contrast, in the target track generator 103A of the inter-vehicle distance control device 400, zero is input to the two-stage moving-average filter $F_{dref}(s)$, where the initial value of the input is set to the inter-vehicle deviation $D_{err}=D-D*$ and the initial value of the input differential value is set to the relative velocity dV. Accordingly, the deviation track $D_{err\_trk}*$ can generate a time history lasting until the inter-vehicle deviation starting from $D_{err}$ converges to zero. Since the input is zero, the deviation track $D_{err\_trk}*$ as an output converges to zero and thereafter mains unchanged at zero.

The FB controller 104 sets a target track $D_{trk}*$ represented by Expression (28) below and the target track differential value $dV_{trk}*$ as target values. The target track $D_{trk}*$ is obtained by adding the target inter-vehicle distance D* to the deviation track $D_{err\_trk}*$ which is the output of the target track generator 103A.

$$D_{trk}*=D_{err\_trk}*+D* \qquad (28)$$

The FB controller 104 then computes the feedback acceleration command $a_{FB}*$ from Expression (9) described in the first preferred embodiment.

With this configuration, settings can be made such that the filter of the target track generator 103A acts only on the deviation of the inter-vehicle distance D from the target inter-vehicle distance D* at the start of control, and the filter of the target track generator 103A does not act on changes in the target inter-vehicle distance D* after the start of control.

<Variation 1>

<Device Configuration>

Figure 18:
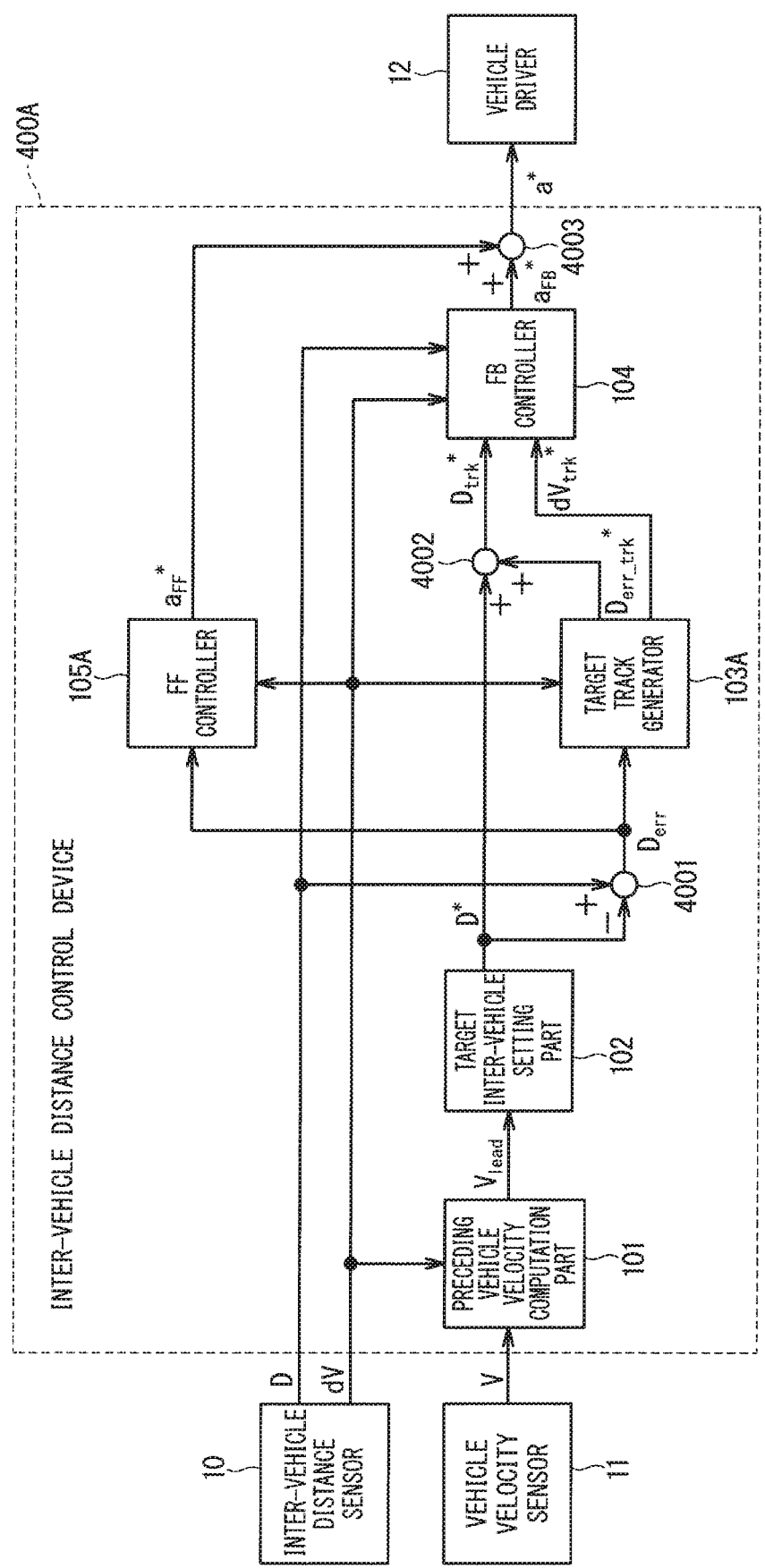
FIG. 18 is a block diagram illustrating a configuration of a variation of the inter-vehicle distance control device according to the fourth preferred embodiment of the present invention.

FIG. 18 is a functional block diagram illustrating a configuration of an inter-vehicle distance control device 400A according to a variation of the fourth preferred embodiment of the present invention. As illustrated in FIG. 18, the inter-vehicle distance control device 400A is configured to additionally include an FF controller 105A in the configuration of the inter-vehicle distance control device 400 illustrated in FIG. 17.

The FF controller 105A receives input of the inter-vehicle deviation $D_{err}$ which is obtained by the subtractor 4001 subtracting the target inter-vehicle distance D* from the inter-vehicle distance D, and computes the feedforward acceleration command $a_{FF}*$.

The feedback acceleration command $a_{FB}*$ which is the output of the FB controller 104 and the feedforward acceleration command $a_{FF}*$ which is the output of the FF controller 105A are added by an adder 4003, and the sum of the feedback acceleration command $a_{FB}*$ and the feedforward acceleration command $a_{FF}*$ is provided as the acceleration command a*, i.e., the output of the inter-vehicle distance control device 400A, to the vehicle driver 12.

<Operations>

Next, an operation of each component of the inter-vehicle distance control device 400A will be described in detail. In the FF controller 105 of the inter-vehicle distance control device 200 according to the second preferred embodiment, the target inter-vehicle distance D* is input to the transfer function. $C_{FF}(s)$, where the initial value of the input is set to the inter-vehicle distance D and the initial value of the input differential value is set to the relative velocity dV. In contrast, in the FF controller 105A of the inter-vehicle distance control device 400A, zero is input to the transfer function $C_{FF}(s)$, where the initial value of the input is set to the inter-vehicle deviation $D_{err}=D-D*$ and the initial value of the input differential value is set to the relative velocity dV. Accordingly, the feedforward acceleration command $a_{FF}*$ can be generated, which is for following the deviation track $D_{err\_trk}*$ that is the time history lasting until the inter-vehicle deviation converges from $D_{err}$ to zero. Since the input is zero, the feedforward acceleration command $a_{FF}*$ converges to zero and thereafter remains unchanged at zero.

As a result, the function of inter-vehicle distance control can be divided such that the inter-vehicle deviation of the inter-vehicle distance D from the target inter-vehicle distance D* at the start of control is controlled under feedforward control and changes in the target inter-vehicle distance D* after the start of control are controlled under feedback control. This facilitates designing the response of inter-vehicle distance control.

<Variation 2>
<Device Configuration>

Figure 19:
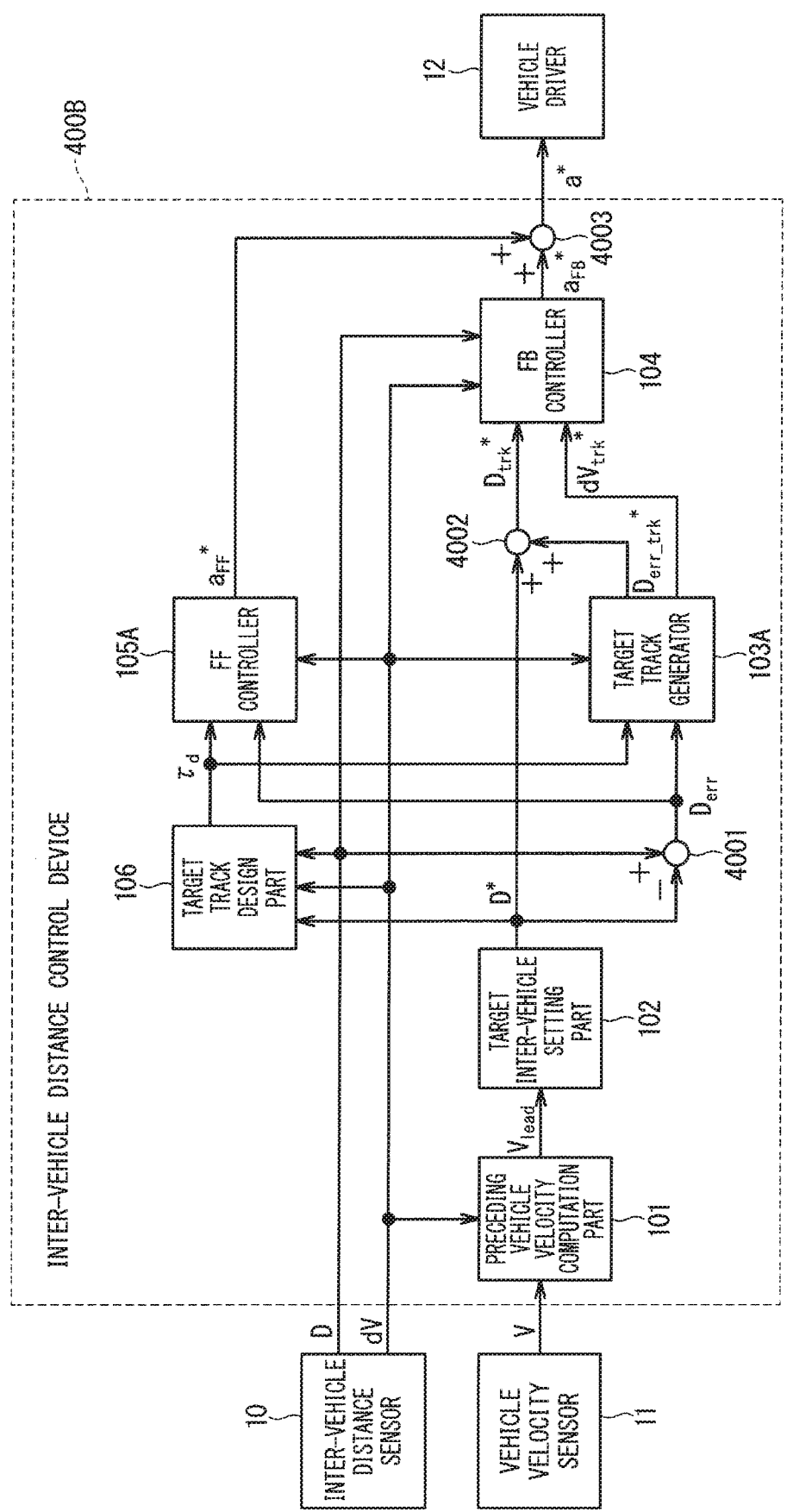
FIG. 19 is a block diagram illustrating a configuration of a variation of the inter-vehicle distance control device according to the fourth preferred embodiment of the present invention.

FIG. 19 is a functional block diagram illustrating a configuration of an inter-vehicle distance control device 400B according to another variation of the fourth preferred embodiment of the present invention. As illustrated in FIG. 19, the inter-vehicle distance control device 400B is configured to additionally include a target track design part 106 in the configuration of the inter-vehicle distance control device 400A illustrated in FIG. 18.

The target track design part 106 receives input of the inter-vehicle distance D, the relative velocity dV, and the target inter-vehicle distance D* which is output from the target inter-vehicle setting part 102. The target track design part 106 then computes and inputs the filter time constant $\tau_d$ to the target track generator 103 and the FF controller 105A.

The target track design part 106 in the inter-vehicle distance control device 400B operates in the same manner as the target track design part 106 described in the third preferred embodiment, and therefore description thereof has been omitted.

Accordingly, in the configuration in which the function of inter-vehicle distance control is divided such that the inter-vehicle deviation of the inter-vehicle distance D from the target inter-vehicle distance D* at the start of control is controlled under feedforward control and changes in the target inter-vehicle distance D* after the start of control are controlled under feedback control, it is possible to make variable the response characteristics for causing convergence of the inter-vehicle deviation of the inter-vehicle distance D from the target inter-vehicle distance D* at the start of control and to the set response characteristics in accordance with driving situations.

<Inter-Vehicle Distance Control Operation>

Next, inter-vehicle distance control operations performed in each driving scene by the inter-vehicle distance control devices 400, 400A, and 400B illustrated in FIGS. 17 to 19 will be described based on simulation results. Note that the initial driving scene is assumed to be a driving scene where the host vehicle OV approaches the distant, slow-moving preceding vehicle LV as in FIG. 5.

<Simulation Results with Inter-Vehicle Distance Control Device 400>

Figure 20:
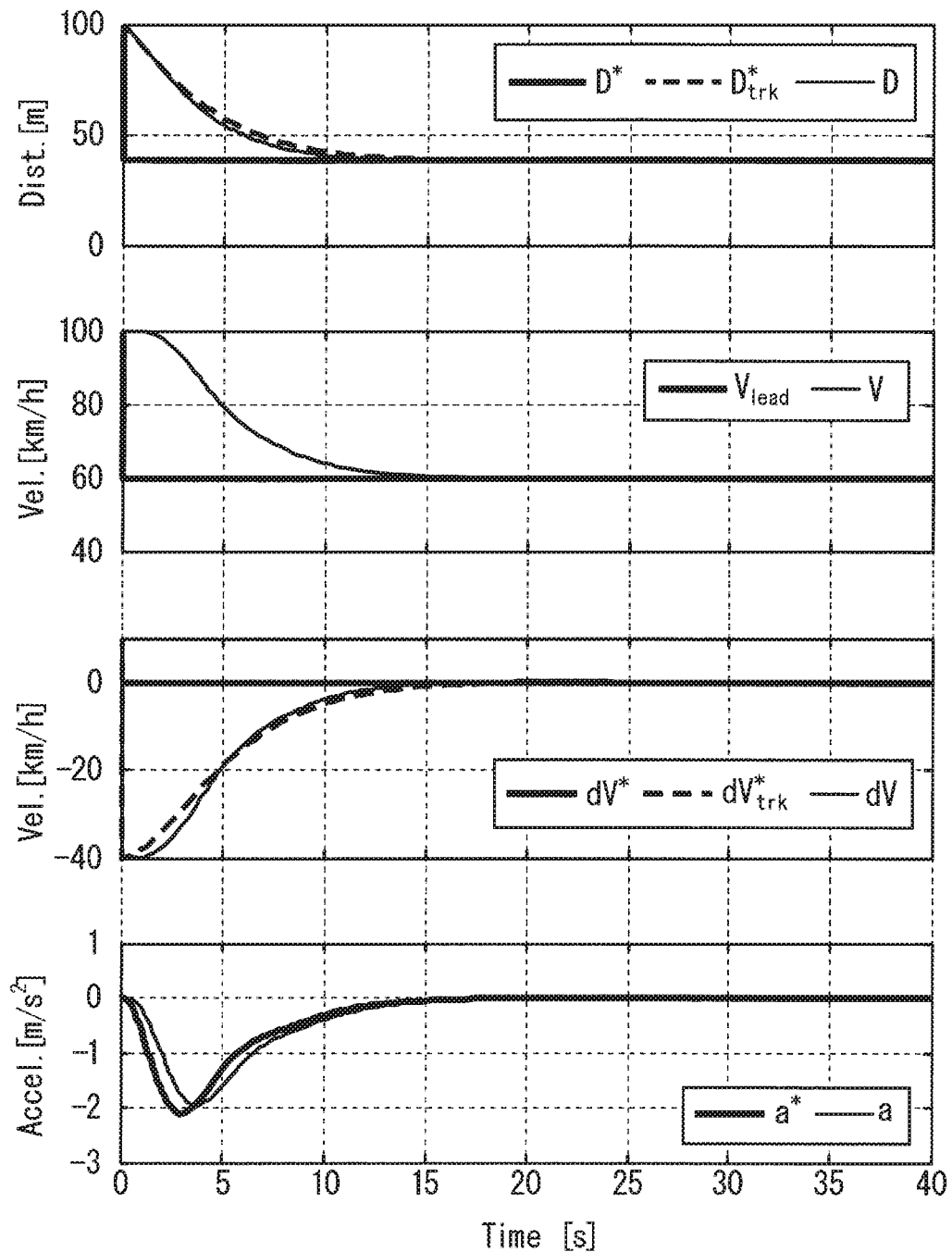
FIG. 20 illustrates simulation results obtained with the inter-vehicle distance control device according to the fourth preferred embodiment of the present invention.

First, FIG. 20 illustrates simulation results obtained with the inter-vehicle distance control device 400 in the driving scene in FIG. 5. FIG. 20 illustrates the simulation results of the inter-vehicle distance, the velocity, the relative velocity, and the acceleration, and charts are arranged in the same manner as in the simulation results described above.

If the time constant of the two-stage moving-average filter in the target track generator 103A is set to $\tau_{1d}=\tau_{2d}=10[s]$, the simulation results illustrated in FIG. 20 are the same as the simulation results of the first preferred embodiment illustrated in FIG. 6. That is, the target track $D_{trk}^*$ defines the time history lasting until the inter-vehicle distance D converges to the target inter-vehicle distance D*, and the inter-vehicle distance can be controlled according to the target track $D_{trk}^*$.

Figure 21:
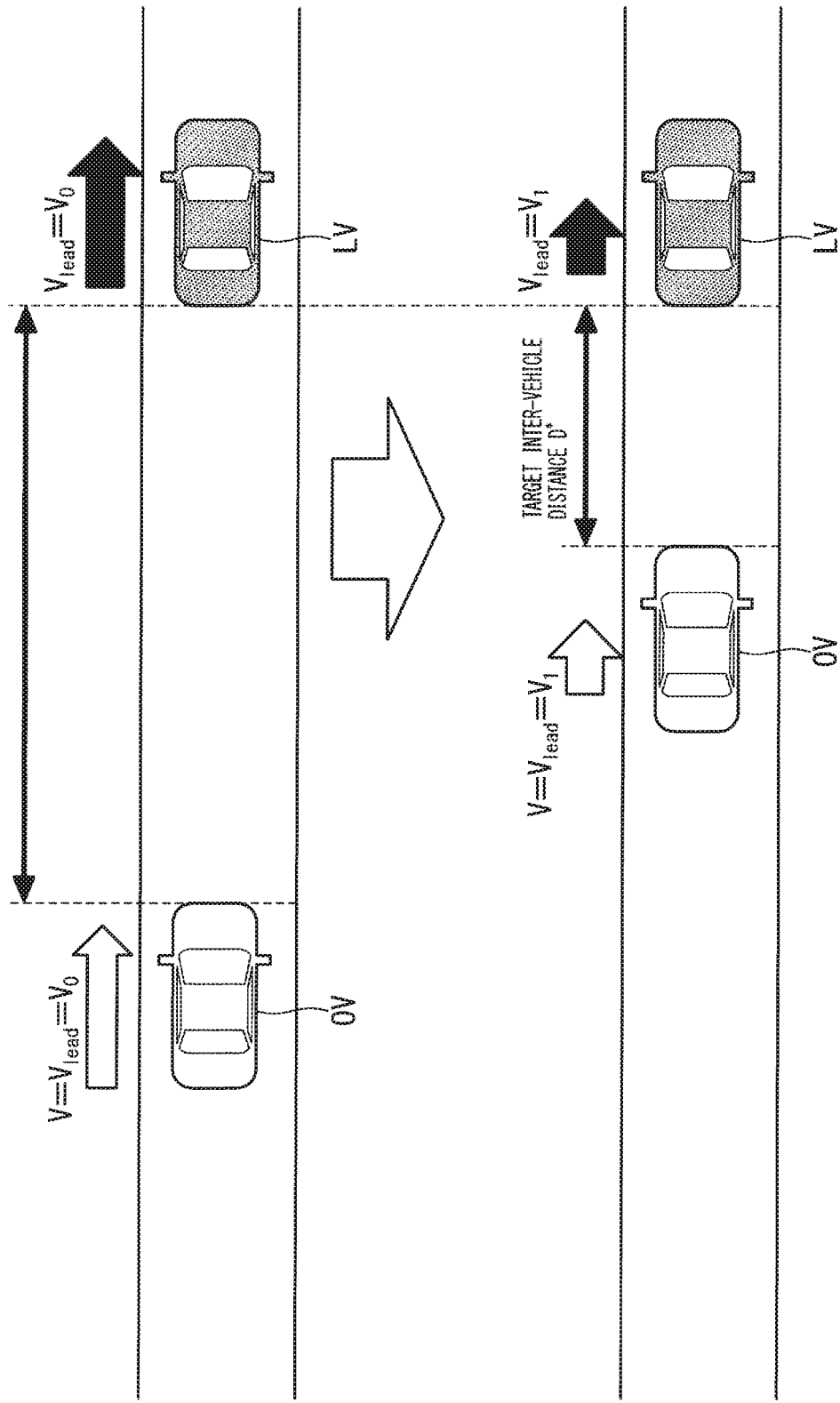
FIG. 21 illustrates a driving scene where the inter-vehicle distance control device performs control according to the fourth preferred embodiment of the present invention.

FIG. 21 illustrates a driving scene where the host vehicle OV runs following the preceding vehicle LV while keeping the target inter-vehicle distance D*, and then the preceding vehicle LV decelerates. The host vehicle OV controls the inter-vehicle distance D to match the target inter-vehicle distance D* that decreases with the deceleration of the preceding vehicle, while decelerating in response to the preceding vehicle LV.

Figure 22:
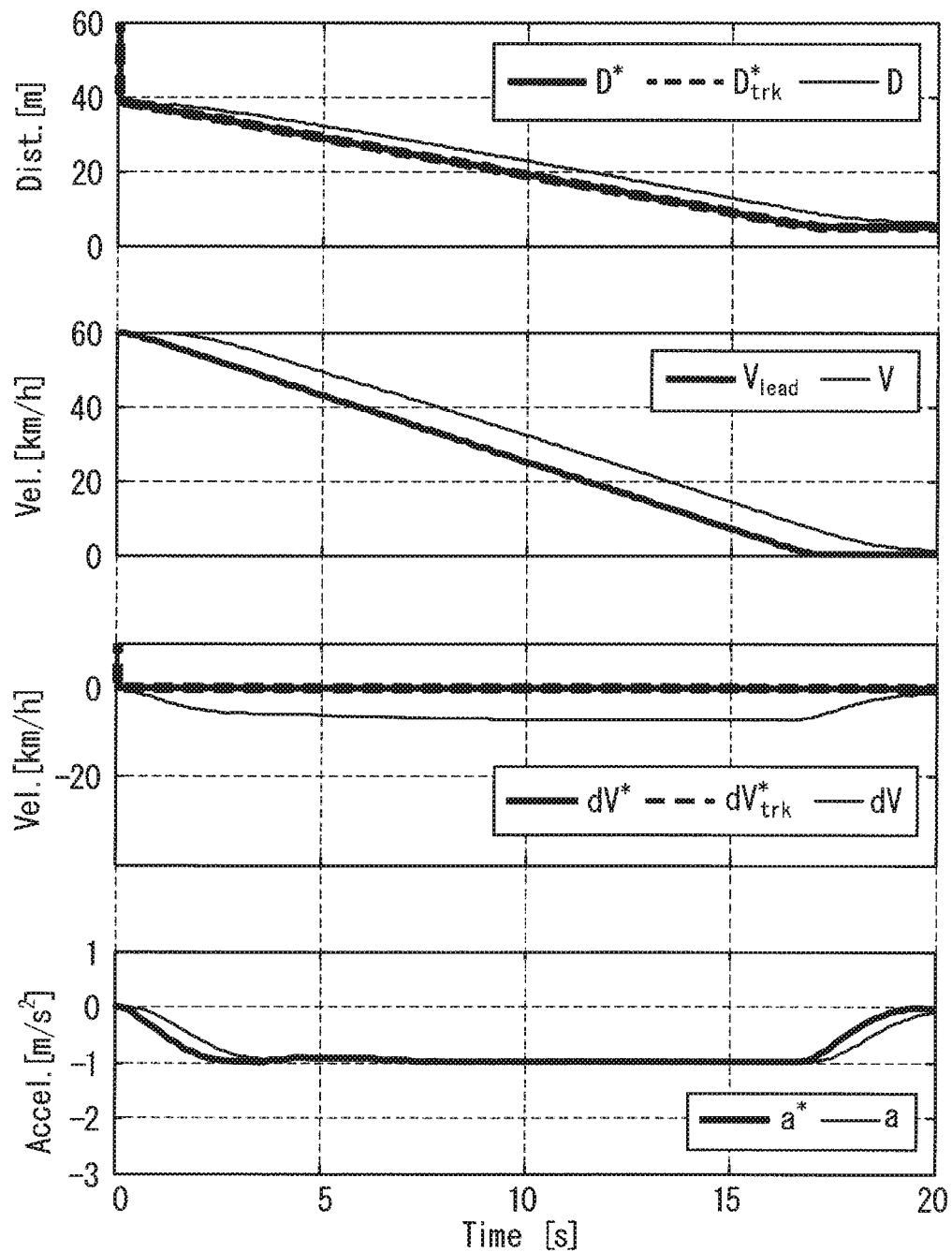
FIG. 22 illustrates simulation results obtained with the inter-vehicle distance control device according to the fourth preferred embodiment of the present invention.
Figure 23:
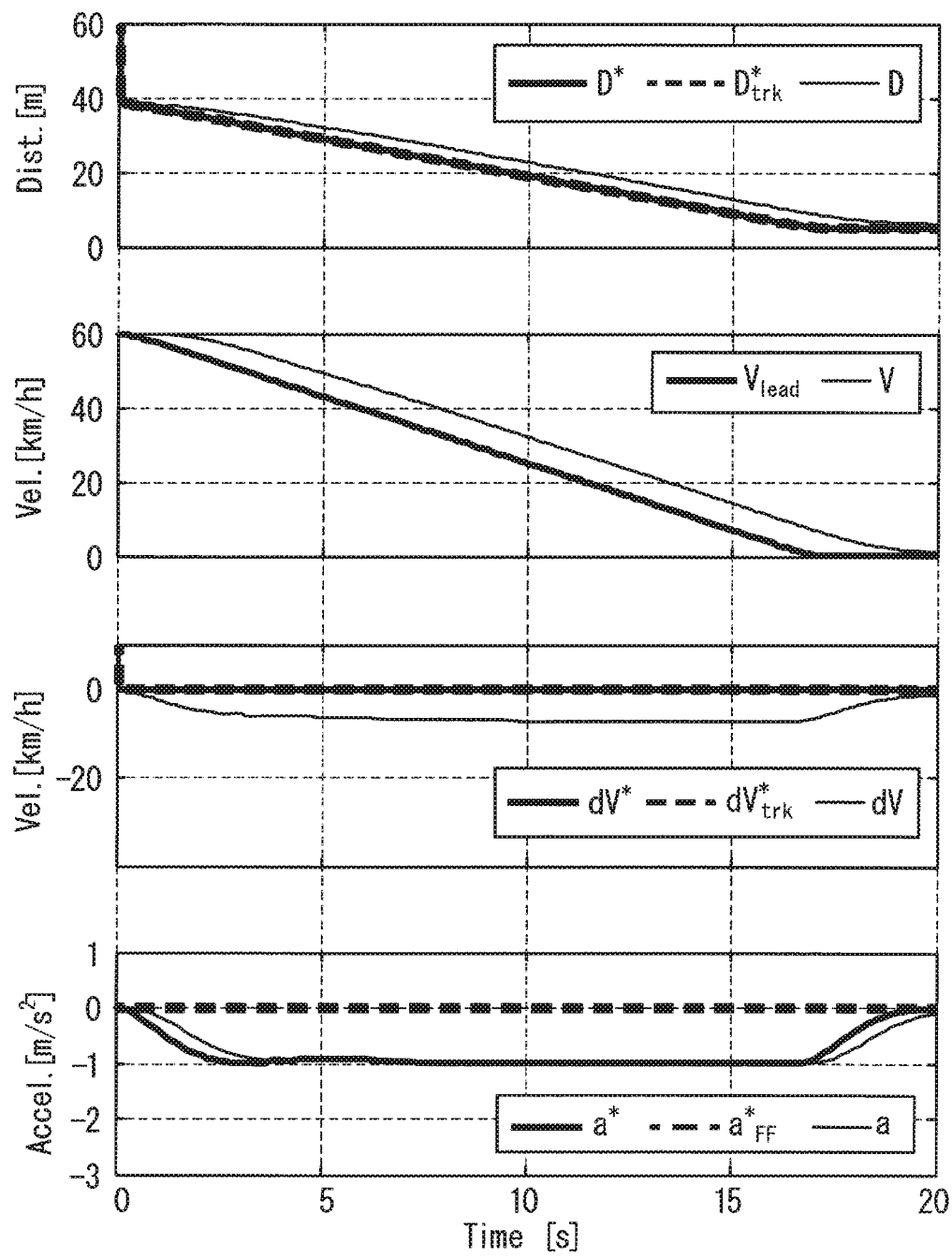
FIG. 23 illustrates simulation results obtained with the inter-vehicle distance control device according to the fourth preferred embodiment of the present invention.

FIG. 22 illustrates simulation results obtained with the inter-vehicle distance control device 400 in the driving scene in FIG. 21, and FIG. 23 illustrates simulation results obtained with the inter-vehicle distance control device 400A in the same scene. FIGS. 22 and 23 illustrate the simulation results of the inter-vehicle distance, the velocity, the relative velocity, and the acceleration, and charts are arranged in the same manner as in the simulation results described above.

The simulation results obtained with the inter-vehicle distance control device 400 illustrated in FIG. 22 show that in the initial state, the host vehicle velocity V is equal to the preceding vehicle velocity $V_{lead}$ 60 [km/h], and the inter-vehicle distance D is equal to the target inter-vehicle distance D*=40 [m]. Since the preceding vehicle decelerates at 1.0 [m/s$^2$] and stops after the start of control, the host vehicle also decelerates in accordance with the preceding vehicle and stops. When the vehicles are stopped, the inter-vehicle distance is equal to the target inter-vehicle distance D*=$D_{stop}$=5 [m]. Since the inter-vehicle deviation. $D_{err}$ and the relative velocity dV which are the initial values of the inputs of the target track generator 103A are both zero, the deviation track $D_{err\_trk}^*$ and the target track differential value $dV_{trk}^*$ which are the outputs of the target track generator 103A are always zero. Thus, the target track $D_{trk}^*$ in the temporal change in inter-vehicle distance in the first section from the top of FIG. 22 always matches the target inter-vehicle distance D*, and the target track differential value $dV_{trk}^*$ in the temporal change in relative velocity in the third section from the top is always zero. In this case, the FB controller 104 performs a feedback control operation for causing the inter-vehicle distance D to coverage to the target inter-vehicle distance D* and causing the relative velocity dV to converge to zero.

Accordingly, in the driving scene in FIG. 21, the target track generator 103A does not act, and response characteristics for the deceleration of the preceding vehicle LV is determined by only the gain of feedback control.

Referring to the simulation results obtained with the inter-vehicle distance control device 400A illustrated in FIG. 23, the temporal change in acceleration in the fourth section from the top illustrates the feedback acceleration command $a_{FF}^*$ as a breakdown of the acceleration command a*.

Since the inter-vehicle deviation D, and the relative velocity dV which are the initial values of the inputs of the FF controller 105A are both zero, the feedforward acceleration command $a_{FF}^*$ which is the output of the FF controller 105A is always zero. Accordingly, in the driving scene in FIG. 21, the inter-vehicle distance control device 400A operates in the same manner as the inter-vehicle distance control device 400.

Figure 24:
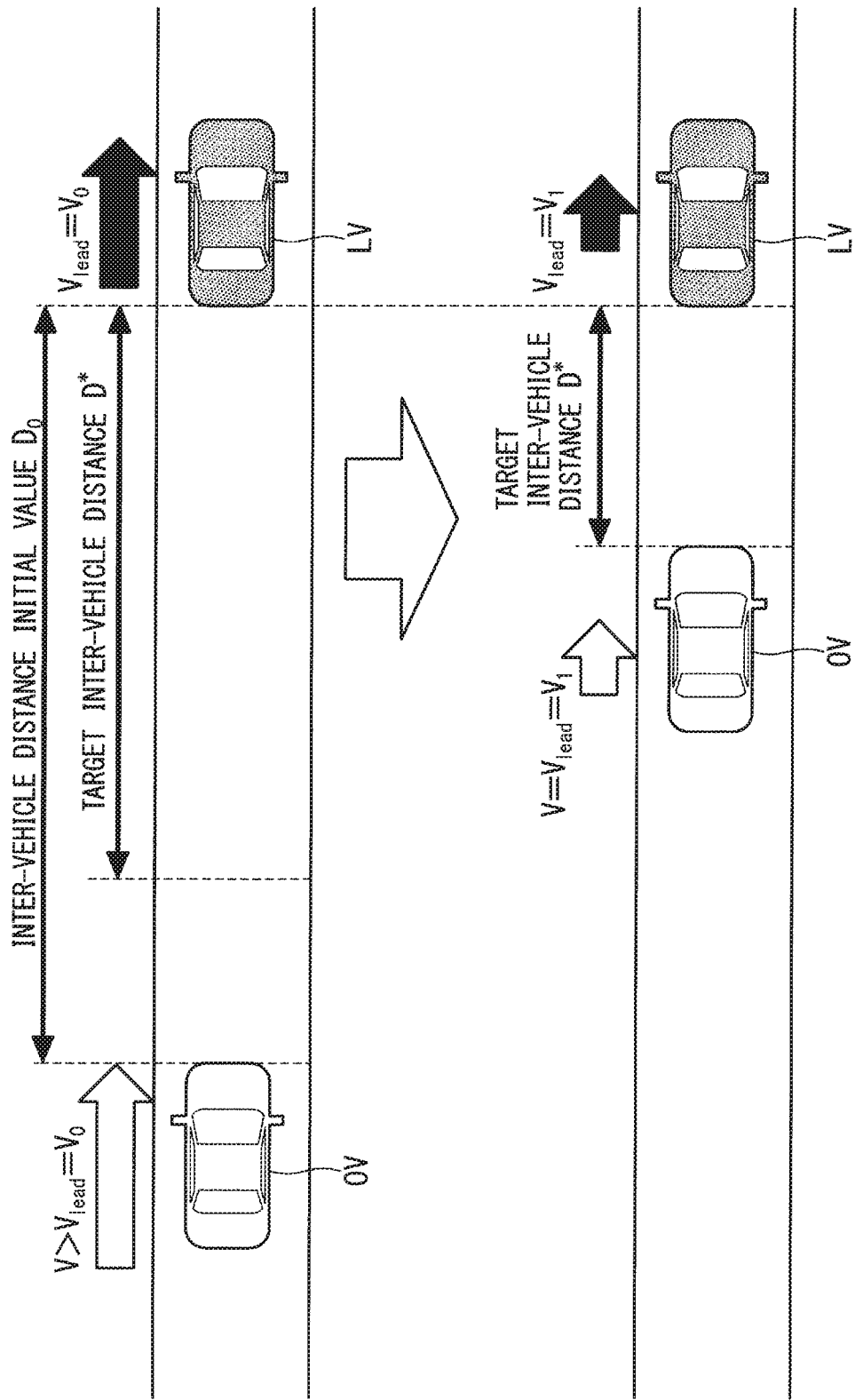
FIG. 24 illustrates a driving scene where the inter-vehicle distance control device performs control according to the fourth preferred embodiment of the present invention.

FIG. 24 illustrates a driving scene where the preceding vehicle LV decelerates while the host vehicle OV approaches the distant, slow-moving preceding vehicle LV. The host vehicle OV simultaneously performs an operation of decelerating to follow the slow-moving preceding vehicle LV and an operation of decelerating in accordance with the deceleration of the preceding vehicle LV.

Figure 25:
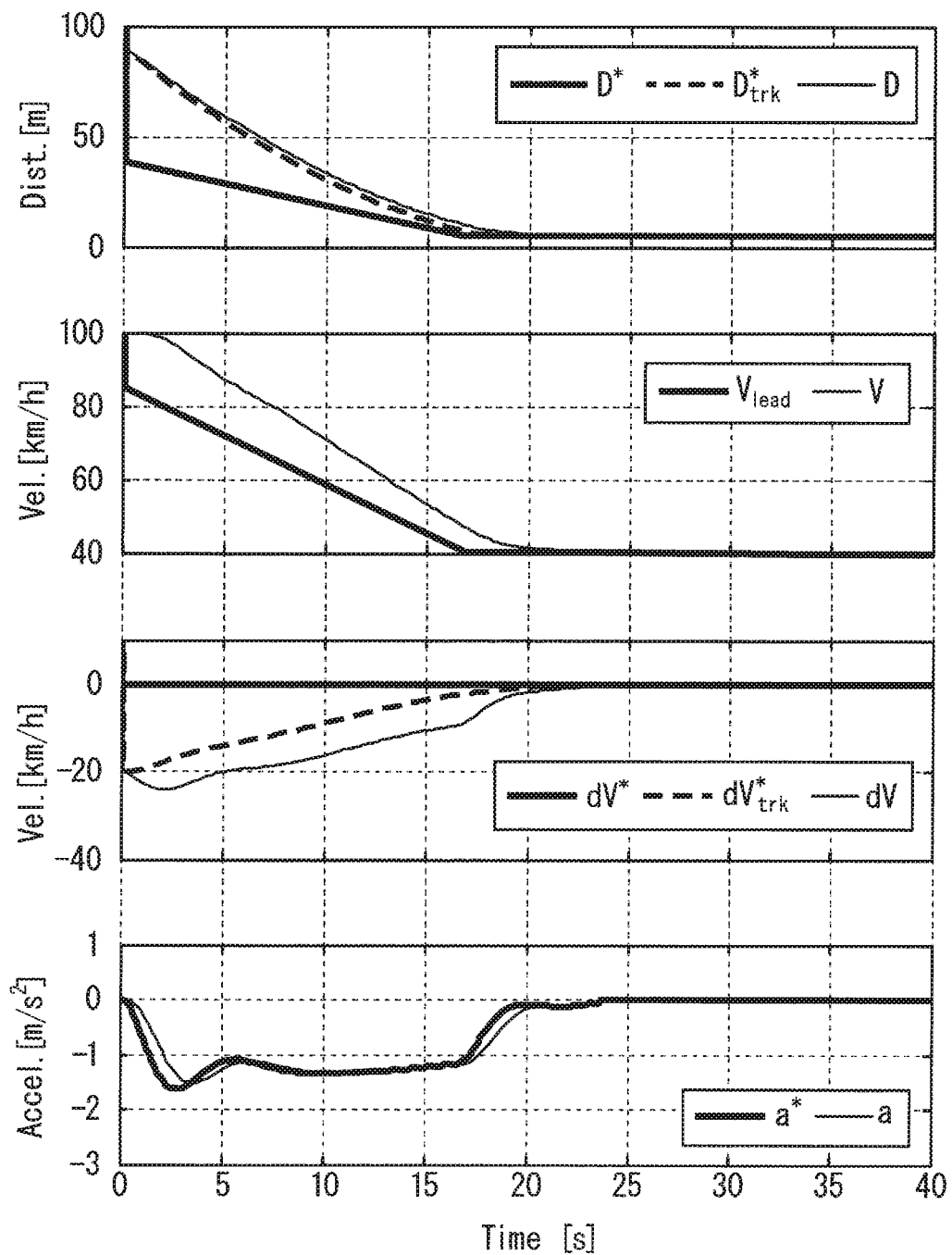
FIG. 25 illustrates simulation results obtained with the inter-vehicle distance control device according to the fourth preferred embodiment of the present invention.
Figure 26:
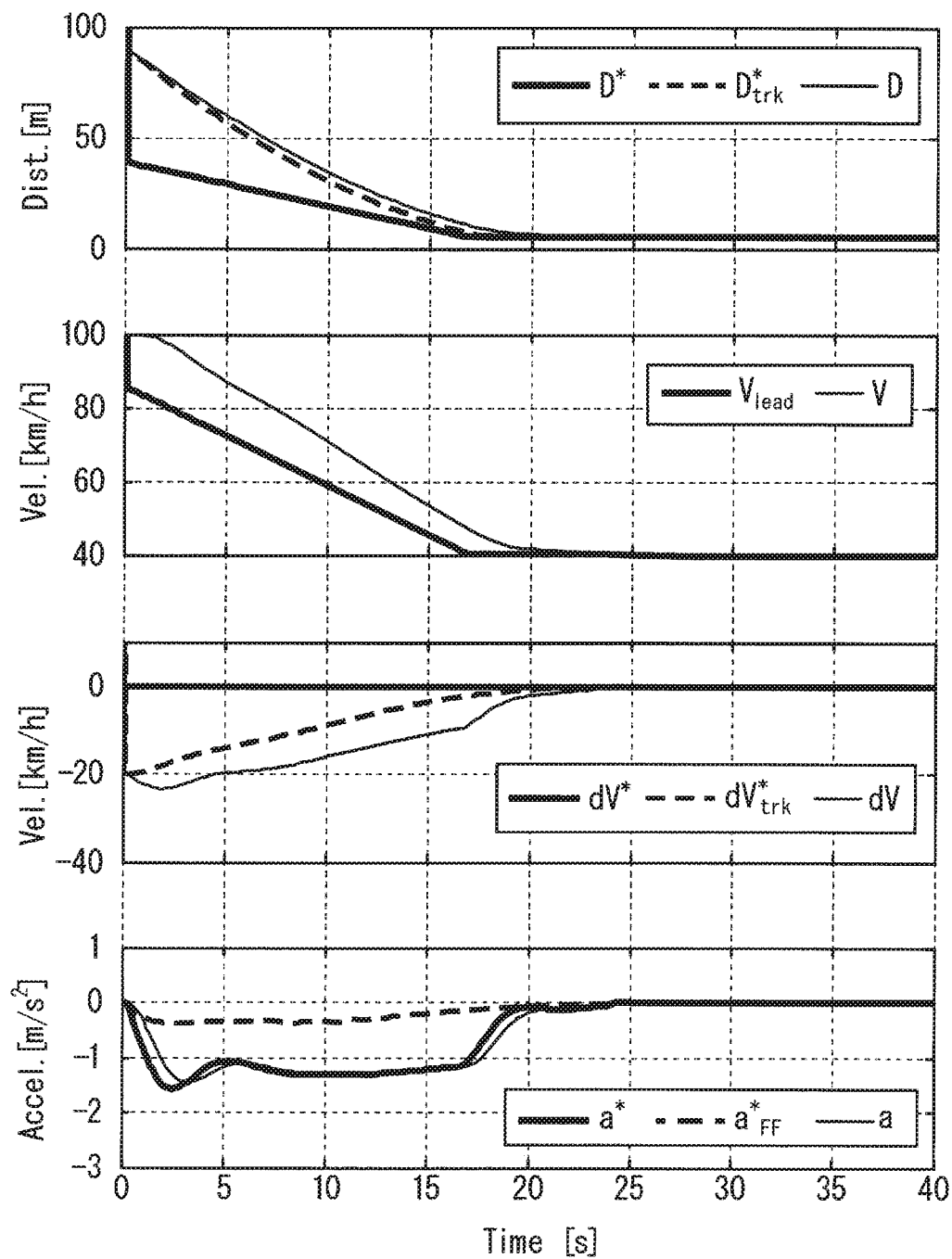
FIG. 26 illustrates simulation results obtained with the inter-vehicle distance control device according to the fourth preferred embodiment of the present invention.
Figure 27:
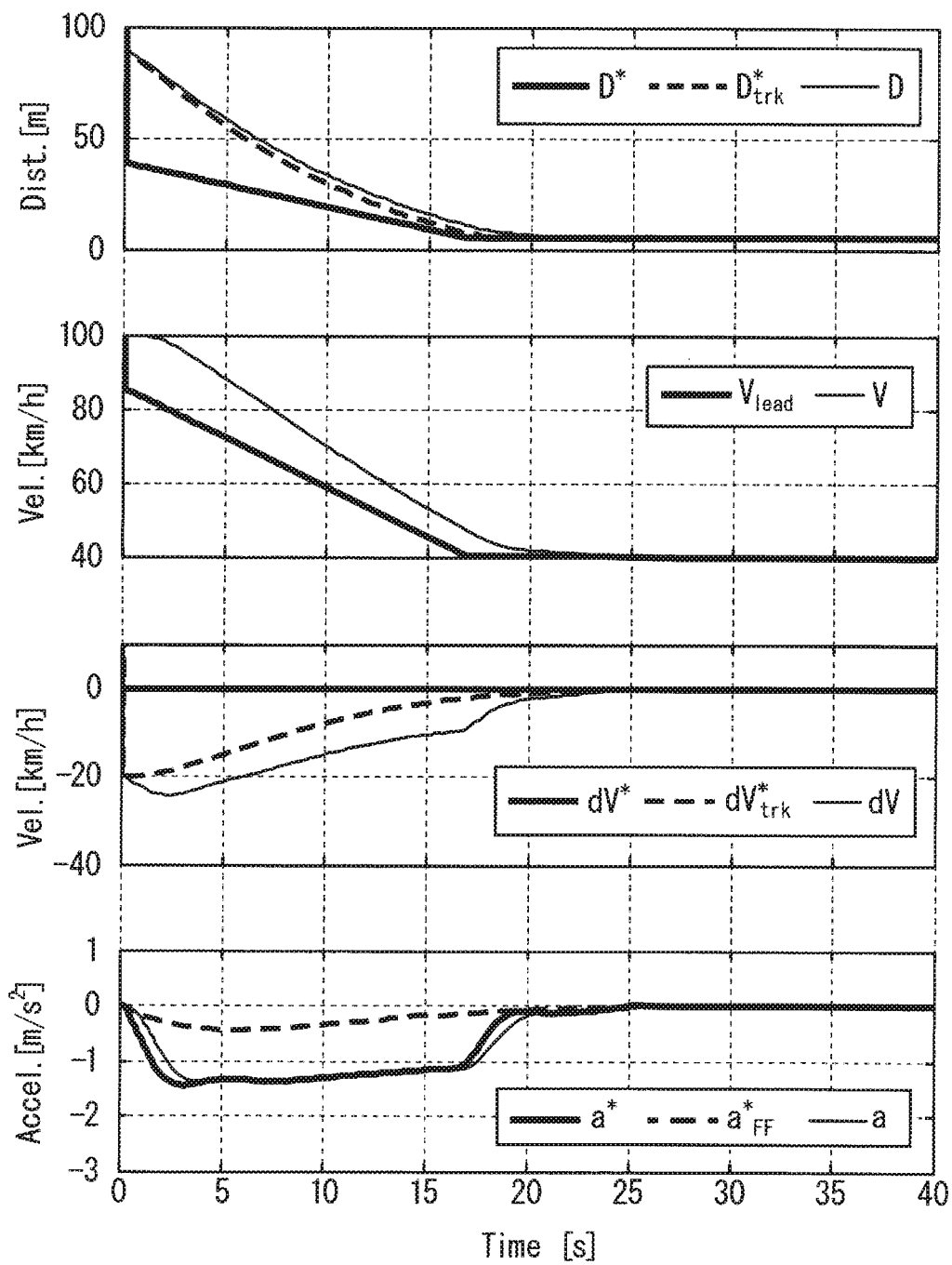
FIG. 27 illustrates simulation results obtained with the inter-vehicle distance control device according to the fourth preferred embodiment of the present invention.

FIG. 25 illustrates simulation results obtained with the inter-vehicle distance control device 400 in the driving scene in FIG. 24, FIG. 26 illustrates simulation results obtained with the inter-vehicle distance control device 400A in the same scene, and FIG. 27 illustrates simulation results obtained with the inter-vehicle distance control device 400B in the same scene. FIGS. 25 to 27 illustrate the simulation results of the inter-vehicle distance, the velocity, the relative velocity, and the acceleration, and charts are arranged in the same manner as in the simulation results described above.

The simulation results of the inter-vehicle distance control device 400 illustrated in FIG. 25 show that in the initial state, the host vehicle velocity V is equal to 80 [km/h], the preceding vehicle velocity $V_{lead}$ is equal to 60 [km/h], the inter-vehicle distance D is equal to 80 [m], and the target inter-vehicle distance D* is equal to 40 [m]. Since the preceding vehicle decelerates at 1.0 [m/s²] and stops after the start of control, the host vehicle also decelerates in accordance with the preceding vehicle and stops. The target track generator 103A generates the deviation track $D_{err\_trk}$* that is a time history lasting until the inter-vehicle deviation $D_{err}$ which is equal to D−D*=40 [m] converges to zero.

After the start of control, as the preceding vehicle LV decelerates to a stop, the target inter-vehicle distance D* decreases from 40 [m] to 5 [m]. Thus, the target track $D_{trk}$* that is the sum of the deviation track $D_{err\_trk}$* and the target inter-vehicle distance D* generates a time history lasting from the initial value of 80 [m] of the inter-vehicle distance to the target inter-vehicle distance 5 [m] when the vehicles are stopped. Then, feedback control is performed such that the target track $D_{trk}$* matches the inter-vehicle distance D. This simultaneously achieves the "operation of decelerating to follow the slow-moving preceding vehicle LV" and the "operation of decelerating in accordance with the deceleration of the preceding vehicle LV."

The temporal change in acceleration [m/s²] in the fourth section from the top of FIG. 25 illustrates the feedback acceleration command $a_{FF}$*, which is the output of the FF controller 105A, as a breakdown of the acceleration command a*. The FF controller 105A computes the feedforward acceleration command $a_{FF}$* for convergence of the inter-vehicle deviation $D_{err}$ from the inter-vehicle deviation $D_{err}$=40 [m] and the relative velocity dV=−20 [km/h] which are the initial values of the inputs.

Note that since the time constant of the two-stage moving-average filter is set to $\tau_{1d}=\tau_{2d}=10$ [s] in the simulation results in FIG. 25, the initial values converge to zero for a time period of $\tau_{1d}+\tau_{2d}=20$ [s] and thereafter remain unchanged at zero.

In FIG. 26 in which the simulation results obtained with the inter-vehicle distance control device 400A are illustrated, the filter time constant $\tau_d$ is designed by the target track design part 106 and set to $\tau_{1d}+\tau_{2d}=18$ [s] in this case. Thus, the initial values converge to zero for a time period of $\tau_{1d}+\tau_{2d}=18$ [s] and thereafter remains unchanged at zero.

As described above, in the fourth preferred embodiment of the present invention, the target track generator 103A generates the deviation track $D_{err\_trk}$* which defines the time history lasting until the inter-vehicle deviation $D_{err}$ converges to zero, and the FB controller 104 performs feedback control using as a target value the target track $D_{trk}$* which is the sum of the deviation track $D_{err\_trk}$* and the target inter-vehicle distance D*. With this configuration, settings can be made such that the filter of the target track generator 103A acts only on the deviation of the inter-vehicle distance D from the target inter-vehicle distance D* at the start of control, and the filter of the target track generator 103A does not act on changes in the target inter-vehicle distance D* after the start of control.

Moreover, in the inter-vehicle distance control device 400A according to a variation of the fourth preferred embodiment, the operation of causing the deviation of the inter-vehicle distance D from the target inter-vehicle distance D* at the start of control to converge can be handled under feedforward control by the presence of the FF controller 105A. With this configuration, in the scene where the host vehicle detects and approaches the distant, slow-moving preceding vehicle while decelerating, response characteristics are defined by the target track generator 103A and the acceleration command is generated by the FF controller 105A, whereas in the scene where the preceding vehicle decelerates and stops, response characteristics are defined by the feedback gain and the acceleration command is generated by the FB controller 104.

Also, the inter-vehicle distance control device 400B according to a variation of the fourth preferred embodiment can design a target track while allowing the response characteristics of the target track generator 103A to satisfy both of the "improvement in ride comfort as a result of suppressing deceleration" and the "suppression of uneasiness as a result of increasing the closest approach distance."

By separating response characteristics required for each driving scene as described above, it is possible to facilitate the design of the response characteristic of the inter-vehicle distance control device and to achieve an inter-vehicle distance control device adaptable to the driver's feeling in various driving situations.

The components of the inter-vehicle distance control devices 400, 400A, and 400B described above can be configured using a computer, and each of these components is implemented by the computer executing programs. That is, the inter-vehicle distance control device 400 illustrated in FIG. 17, the inter-vehicle distance control device 400A illustrated in FIG. 18, and the inter-vehicle distance control device 400B illustrated in FIG. 19 are implemented by, for example, the processing circuit 20 illustrated in FIG. 2. When the inter-vehicle distance control device 400 illustrated in FIG. 17, the inter-vehicle distance control device 400A illustrated in FIG. 18, and the inter-vehicle distance control device 400B illustrated in FIG. 19 are configured using a processor, their hardware configurations are as illustrated in FIG. 3.

It should be noted that the present invention can be implemented by freely combining each of the embodiments or by making a modification or omission on the embodiments as appropriate without departing from the scope of the present invention.

What is claimed is:

1. An inter-vehicle distance control apparatus for controlling an inter-vehicle distance from a preceding vehicle by computing an acceleration command on the basis of the inter-vehicle distance from the preceding vehicle, a relative velocity of the preceding vehicle, and a velocity of a host vehicle, and providing the acceleration command as an input to a vehicle driver that controls a vehicle drive, the inter-vehicle distance control apparatus comprising:
   a memory storing instructions; and
   a processor coupled to the memo and configured to execute the instructions to perform:
      a preceding vehicle velocity computation routine to compute a velocity of the preceding vehicle on the basis of the velocity of the host vehicle and the relative velocity of the preceding vehicle,
      a target inter-vehicle setting routine to set a target inter-vehicle distance from the preceding vehicle on the basis of the velocity of the preceding vehicle,
      a target track generation routine to generate a target track and a target track differential value that is a differential value of the target track, the target track defining a time history of the inter-vehicle distance lasting until an initial value of the inter-vehicle distance reaches the target inter-vehicle distance, and
      a feedback control routine to compute a feedback acceleration command by multiplying each of a deviation of the inter-vehicle distance from the target track and a deviation of the relative velocity from the target track differential value by a gain, wherein the feedback acceleration command is output as the acceleration command.

2. The inter-vehicle distance control apparatus according to claim 1, wherein the processor perform:

a feedforward control routine to compute a feedforward acceleration command by using a transfer function of the target track generation routine and an inverse transfer function of the vehicle driver, where the inter-vehicle distance is set to an initial value of an input, the relative velocity is set to an initial value of an input differential value, and the target inter-vehicle distance is used as the input, wherein the acceleration command is a sum of the feedback acceleration command from the feedback control routine and the feedforward acceleration command from the feedforward control routine.

3. The inter-vehicle distance control apparatus according to claim 2, wherein the target track generation routine generates the target track using a two-stage moving-average filter that combines two moving-average filters, and the processor is further configured to execute the instructions to perform:

a target track design routine to compute a filter time constant that defines a response characteristic of the target track generation routine on the basis of the inter-vehicle distance, the target inter-vehicle distance, and the relative velocity, wherein the target track generation routine generates the target track on the basis of the filter time constant, and the feedforward control routine computes the feedforward acceleration command on the basis of the filter time constant.

4. The inter-vehicle distance control apparatus according to claim 3, wherein the target track design routine determines the filter time constant of the target track generation routine to set an average value of acceleration during a first half of a vehicle-following process to a preset acceleration design value, the vehicle-following process being a process in which the inter-vehicle distance converges to the target inter-vehicle distance and the relative velocity converges to zero.

5. The inter-vehicle distance control apparatus according to claim 3, wherein the target track design routine determines the filter time constant of the target track generation routine to set a closest approach distance to a preset closest approach distance design value, the closest approach distance being a minimum value of the inter-vehicle distance during a vehicle-following process in which the inter-vehicle distance converges to the target inter-vehicle distance and the relative velocity converges to zero.

6. The inter-vehicle distance control apparatus according to claim 3, wherein the target track design routine sets a plurality of acceleration design values and a plurality of closest approach distance design values on the basis of a condition under which the preceding vehicle is followed and that is defined by the inter-vehicle distance, the target inter-vehicle distance, and the relative velocity, each of the plurality of acceleration design values defines an average value of acceleration during a first half of a vehicle-following process, each of the plurality of closest approach distance design values specifies a closest approach distance defined by a minimum value of the inter-vehicle distance during the vehicle-following process, and the response characteristic of the target track generation routine is determined by selecting an acceleration design value and a closest approach distance design value that increase the closest approach distance and reduce magnitude of acceleration or deceleration during the vehicle-following process, from among the plurality of acceleration design values and the plurality of closest approach distance design values.

7. The inter-vehicle distance control apparatus according to claim 1, wherein the gain includes:

a gain of proportional control by which the deviation of the inter-vehicle distance from the target track is multiplied; and a gain of derivative control by which the deviation of the relative velocity from the target track differential value is multiplied.

8. An inter-vehicle distance control apparatus for controlling an inter-vehicle distance from a preceding vehicle by computing an acceleration command on the basis of the inter-vehicle distance from the preceding vehicle, a relative velocity of the preceding vehicle, and a velocity of a host vehicle, and inputting the acceleration command to a vehicle driver that controls vehicle drive, the inter-vehicle distance control apparatus comprising:

a memory storing instructions; and a processor coupled to the memory and configured to execute the instructions to perform:

a preceding vehicle velocity computation routine to compute a velocity of the preceding vehicle on the basis of the velocity of the host vehicle and the relative velocity of the preceding vehicle, a target inter-vehicle setting routine to set a target inter-vehicle distance from the preceding vehicle on the basis of the velocity of the preceding vehicle, a target track generation routine to generate a deviation track and a target track differential value that is a differential value of the deviation track, the deviation track defining a time history of an inter-vehicle deviation lasting until the inter-vehicle deviation reaches zero, the inter-vehicle deviation being obtained by subtracting the target inter-vehicle distance from the inter-vehicle distance, and a feedback control routine to compute a feedback acceleration command by multiplying each of a deviation of the inter-vehicle distance from the target track and a deviation of the relative velocity from the target track differential value by a gain, assuming that the target track is a sum of the deviation track and the target inter-vehicle distance, wherein the feedback acceleration command is output as the acceleration command.

9. The inter-vehicle distance control apparatus according to claim 8, wherein the processor is further configured to execute the instructions to perform:

a feedforward control routine to compute a feedforward acceleration command by using a transfer function of the target track generation routine and an inverse transfer function of the vehicle driver, where the inter-vehicle deviation obtained by subtracting the target inter-vehicle distance from the inter-vehicle distance is set to an initial value of an input, the relative velocity is set to an initial value of an input differential value, and zero is used as the input, wherein the acceleration command is a sum of the feedback acceleration command from the feedback control routine and the feedforward acceleration command from the feedforward control routine.

10. The inter-vehicle distance control apparatus according to claim 9, wherein the target track generation routine generates the target track using a two-stage moving-average filter that combines two moving-average filters, the processor is further configured to execute the instructions to perform:

a target track design routine to compute a filter time constant that defines a response characteristic of the target track generation routine on the basis of the inter-vehicle distance, the target inter-vehicle distance, and the relative velocity, wherein the target track generation routine generates the target track on the basis of the filter time constant, and the feedforward control routine computes the feedforward acceleration command on the basis of the filter time constant.

11. The inter-vehicle distance control apparatus according to claim 10, wherein the target track design routine determines the filter time constant of the target track generation routine to set an average value of acceleration during a first half of a vehicle-following process to a preset acceleration design value, the vehicle-following process being a process in which the inter-vehicle distance converges to the target inter-vehicle distance and the relative velocity converges to zero.

12. The inter-vehicle distance control apparatus according to claim 10, wherein the target track design routine determines the filter time constant of the target track generation routine to set a closest approach distance to a preset closest approach distance design value, the closest approach distance being a minimum value of the inter-vehicle distance during a vehicle-following process in which the inter-vehicle distance converges to the target inter-vehicle distance and the relative velocity converges to zero.

13. The inter-vehicle distance control apparatus according to claim 10, wherein the target track design routine sets a plurality of acceleration design values and a plurality of closest approach distance design values on the basis of a condition under which the preceding vehicle is followed and that is defined by the inter-vehicle distance, the target inter-vehicle distance, and the relative velocity, each of the plurality of acceleration design values specifies an average value of acceleration during a first half of a vehicle-following process, each of the plurality of closest approach distance design values specifies a closest approach distance defined by a minimum value of the inter-vehicle distance during the vehicle-following process, and the response characteristic of the target track generation routine is determined by selecting an acceleration design value and a closest approach distance design value that increase the closest approach distance and reduce magnitude of acceleration or deceleration during the vehicle-following process, from among the plurality of acceleration design values and the plurality of closest approach distance design values.

14. The inter-vehicle distance control apparatus according to claim 8, wherein the gain includes:

a gain of proportional control by which the deviation of the inter-vehicle distance from the target track is multiplied; and a gain of derivative control by which the deviation of the relative velocity from the target track differential value is multiplied.

* * * * *